June 1, 1965 W. JOSEPH 3,186,029
MACHINE FOR MAKING DISK PHONOGRAPH RECORDS
Filed Aug. 23, 1962 19 Sheets-Sheet 1

INVENTOR.
WILLIAM JOSEPH
BY Darby + Darby
ATTORNEYS

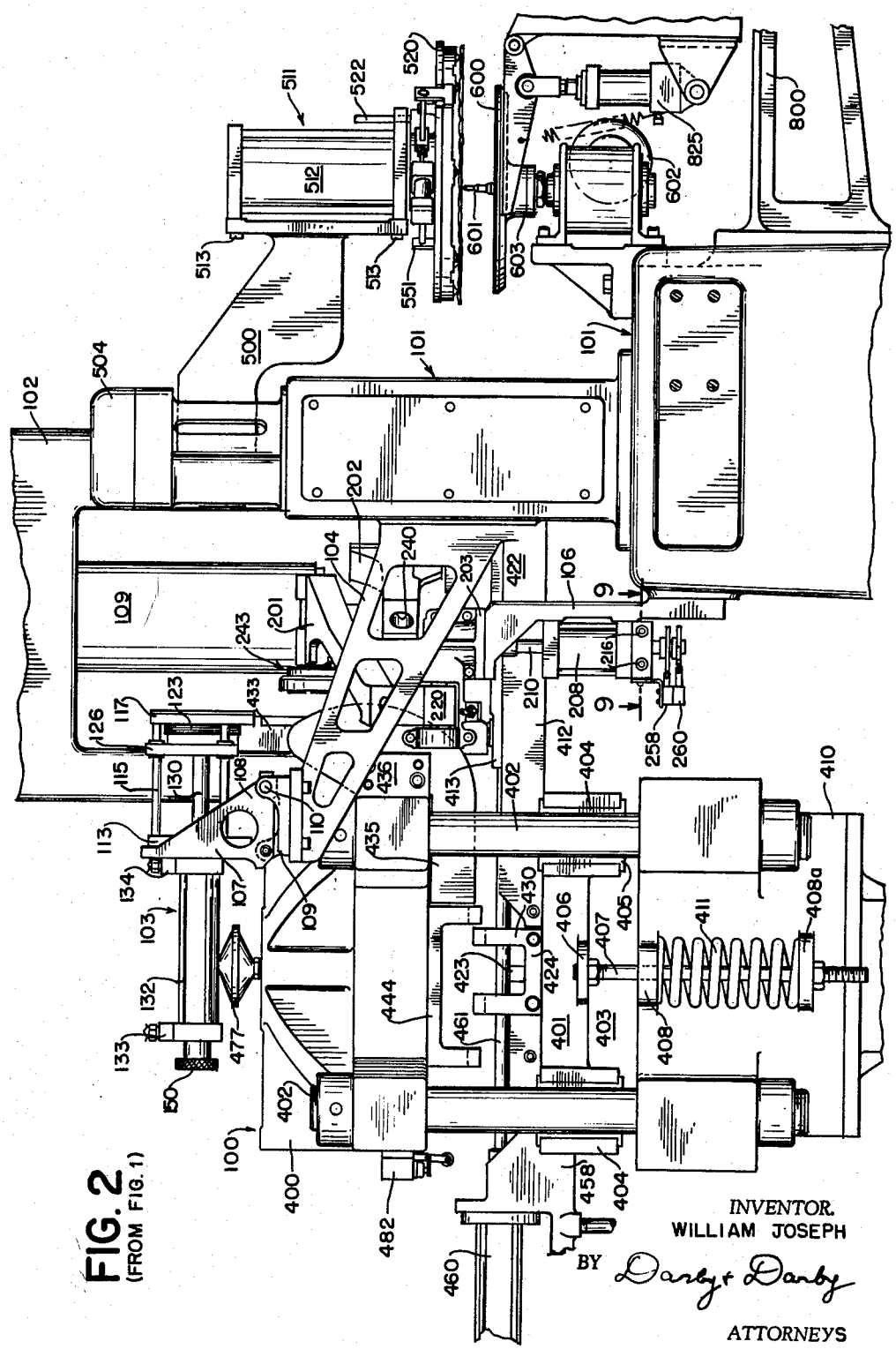

June 1, 1965 W. JOSEPH 3,186,029
MACHINE FOR MAKING DISK PHONOGRAPH RECORDS
Filed Aug. 23, 1962 19 Sheets-Sheet 3
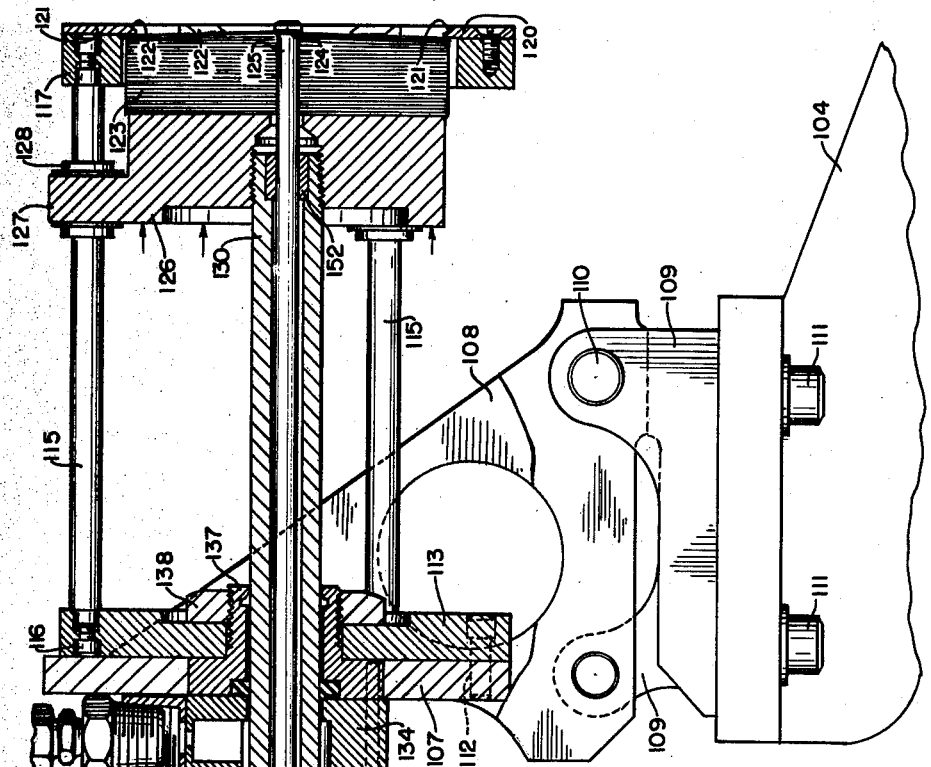
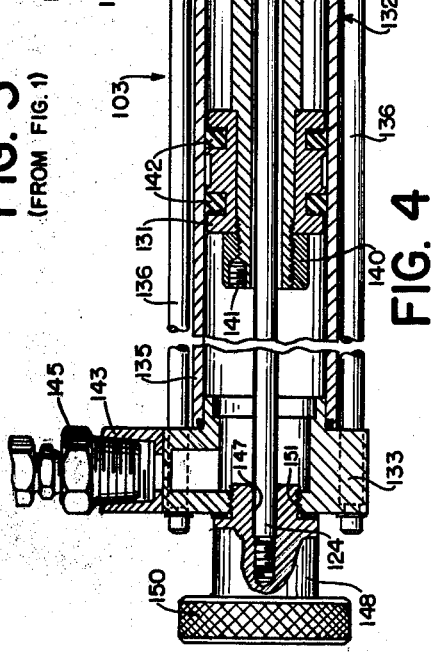
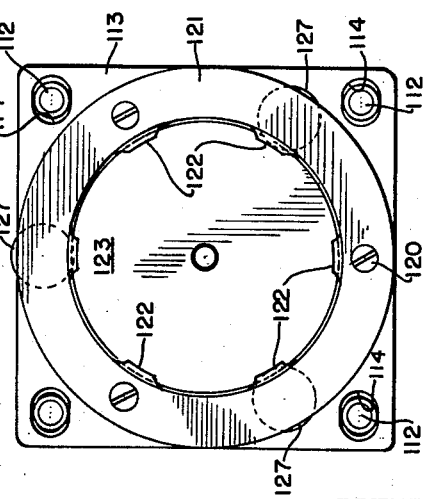
INVENTOR.
WILLIAM JOSEPH
BY Darby + Darby
ATTORNEYS June 1, 1965 W. JOSEPH 3,186,029
MACHINE FOR MAKING DISK PHONOGRAPH RECORDS
Filed Aug. 23, 1962 19 Sheets-Sheet 4

(FROM FIG. 1)

(FROM FIG. 1)

INVENTOR.
WILLIAM JOSEPH
BY Darby & Darby
ATTORNEYS

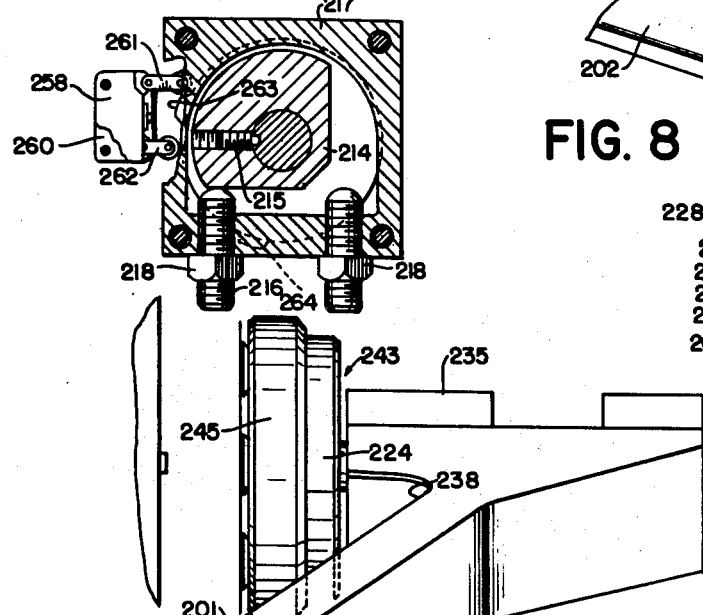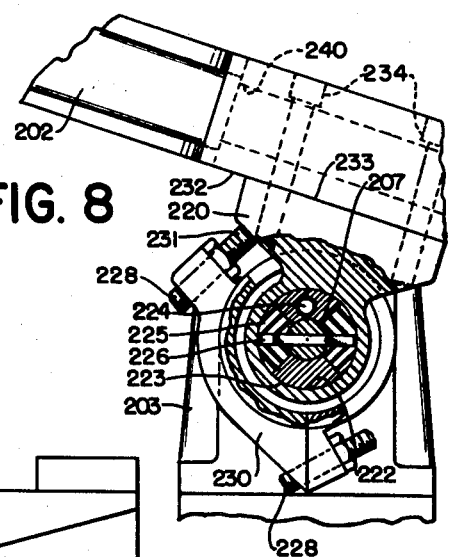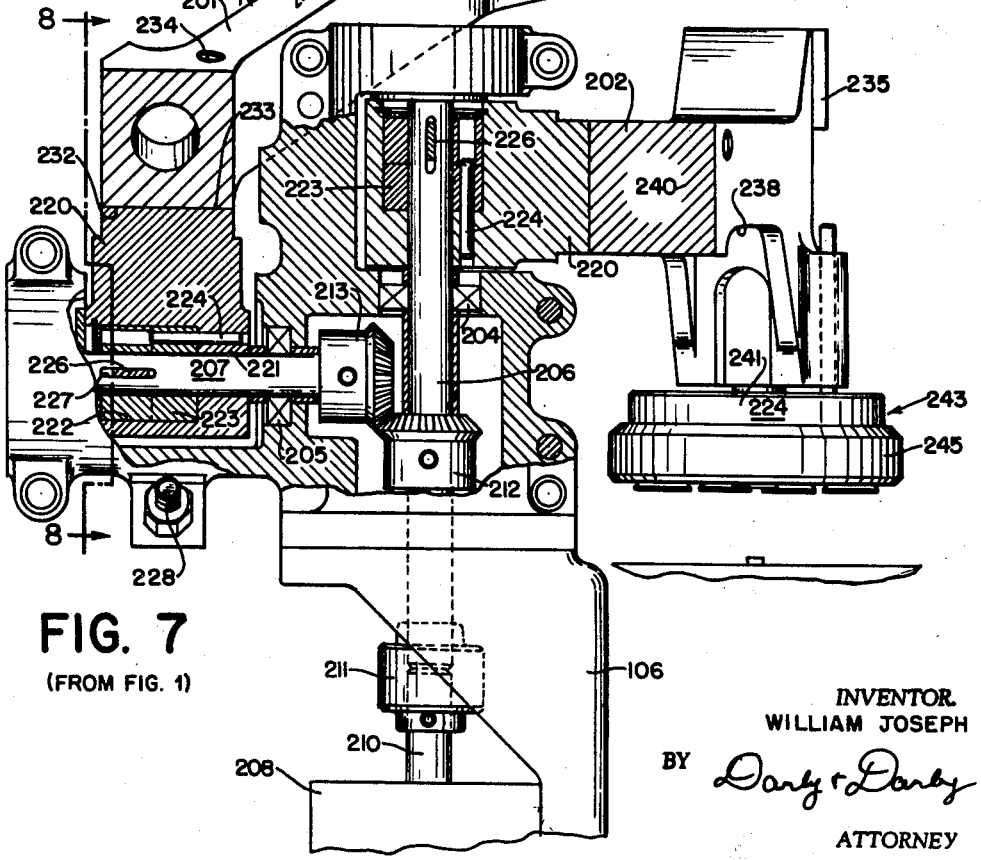

June 1, 1965 W. JOSEPH 3,186,029
MACHINE FOR MAKING DISK PHONOGRAPH RECORDS
Filed Aug. 23, 1962 19 Sheets-Sheet 6
FIG. 10
(FROM FIG. 1)
FIG. 10A
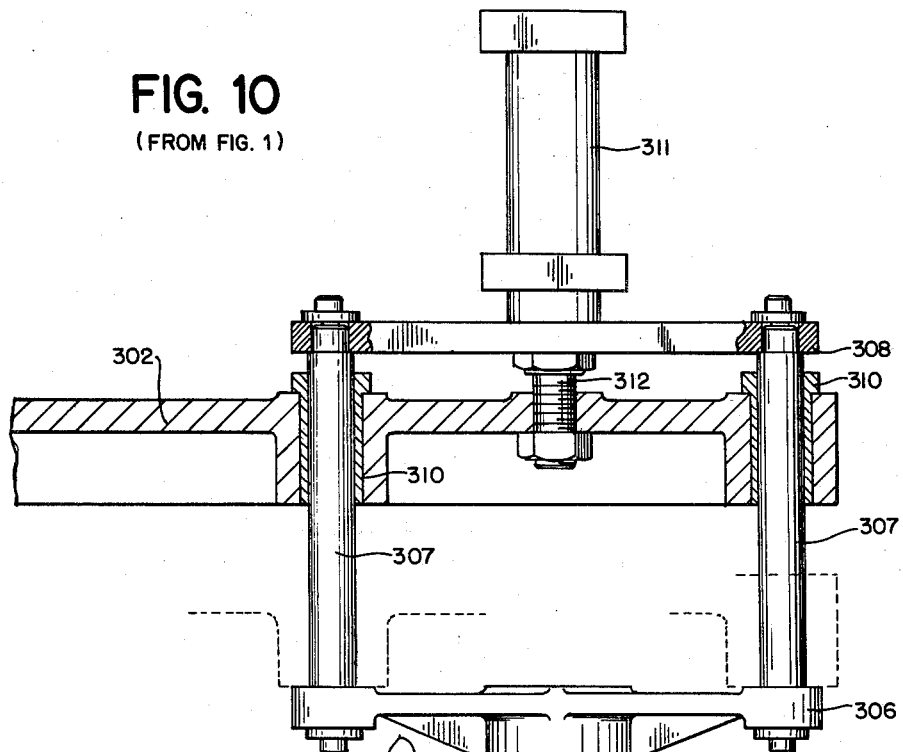
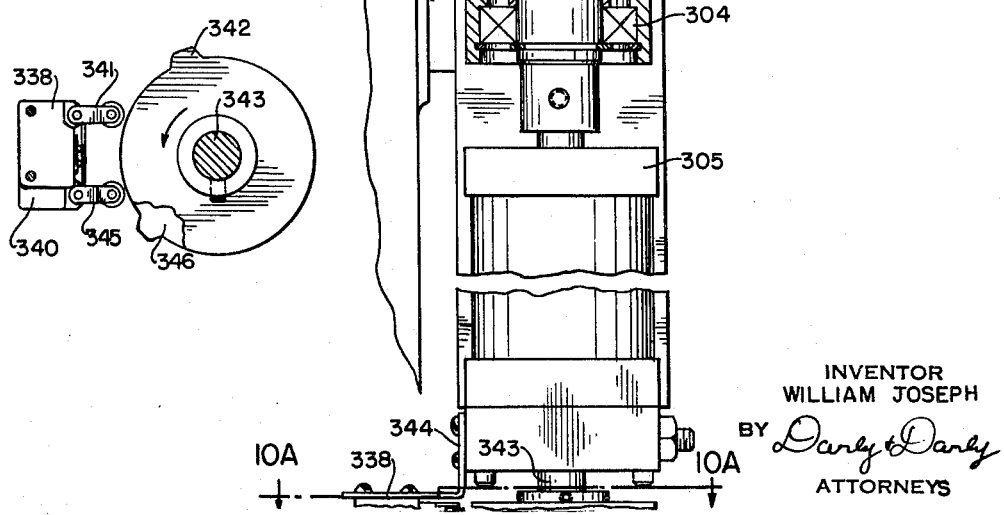
INVENTOR
WILLIAM JOSEPH
BY Darby & Darby
ATTORNEYS

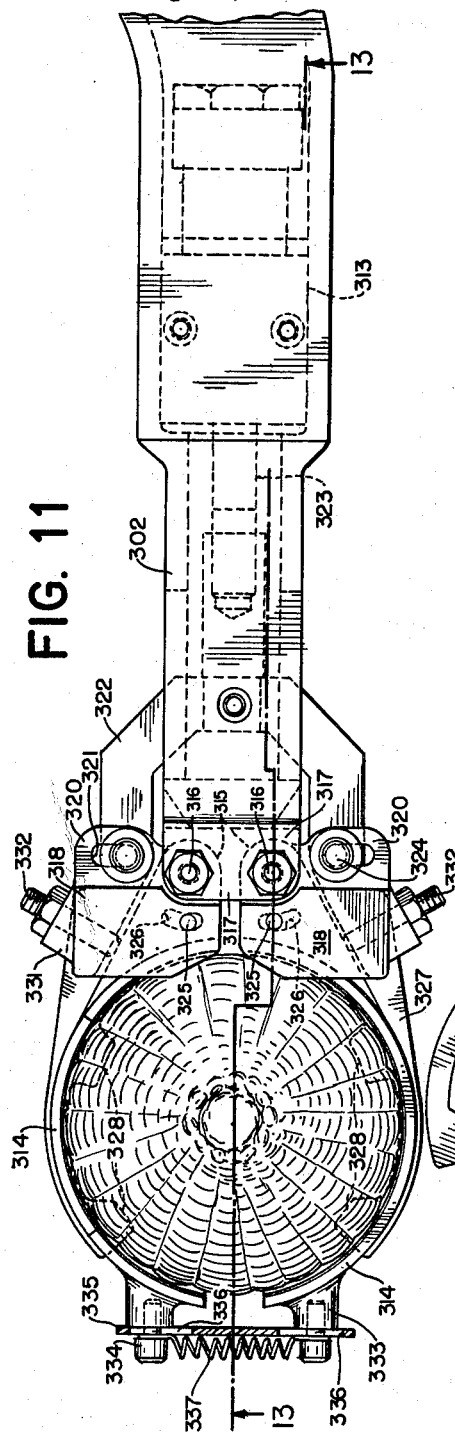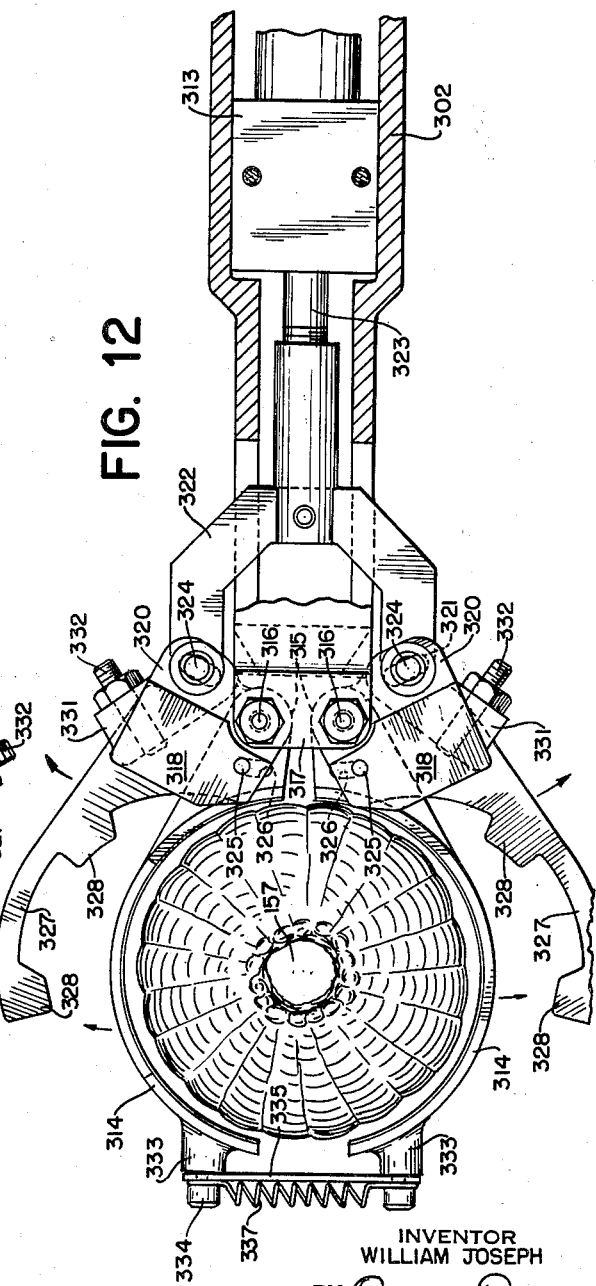

June 1, 1965 W. JOSEPH 3,186,029
MACHINE FOR MAKING DISK PHONOGRAPH RECORDS
Filed Aug. 23, 1962 19 Sheets-Sheet 8
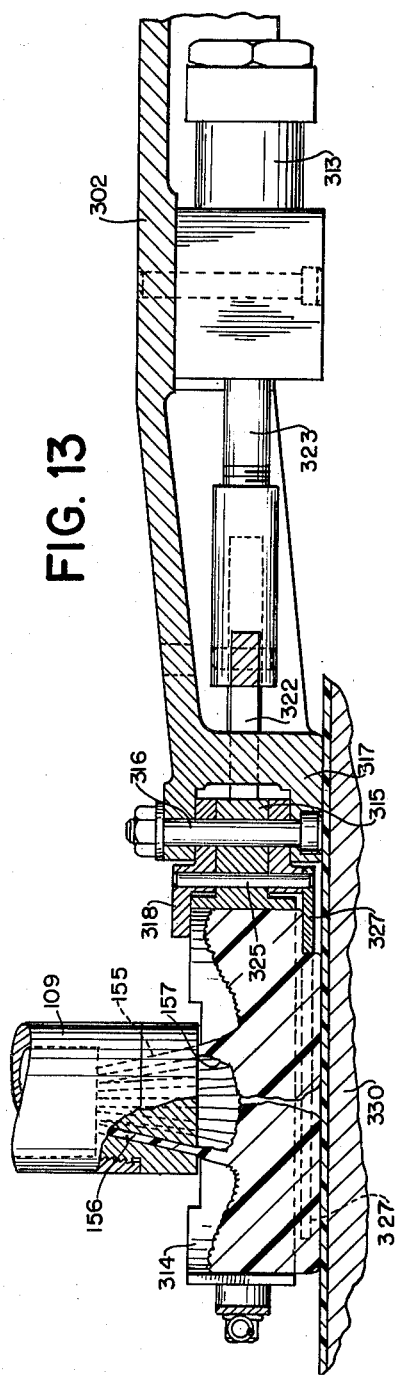
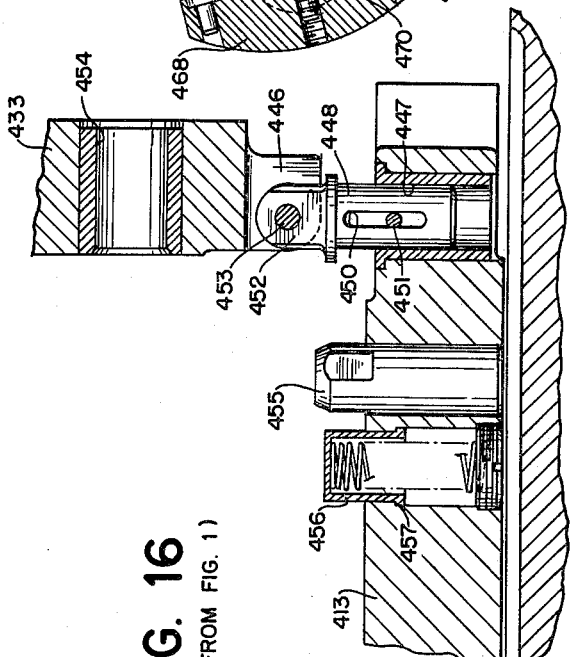
INVENTOR
WILLIAM JOSEPH
BY
ATTORNEYS

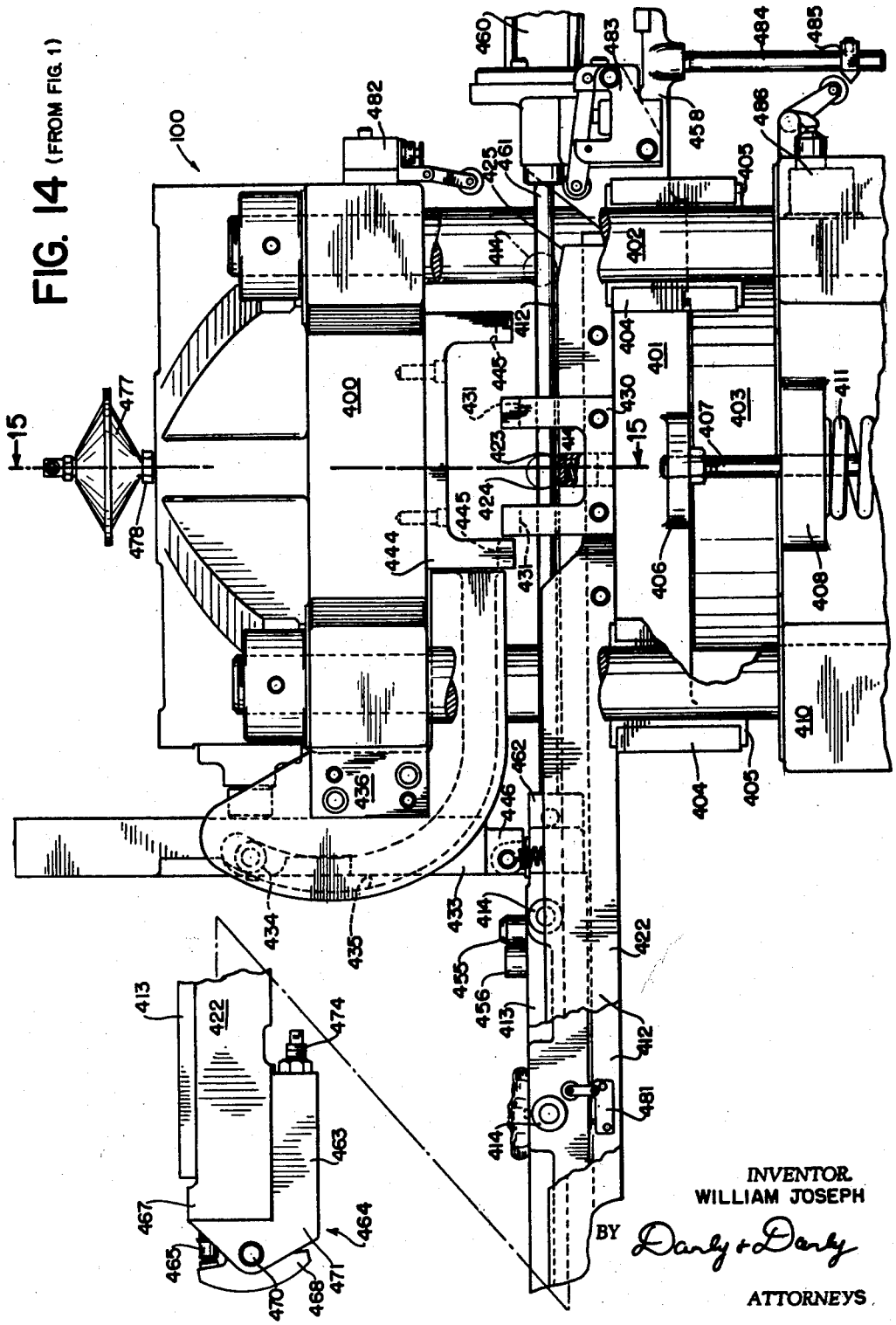

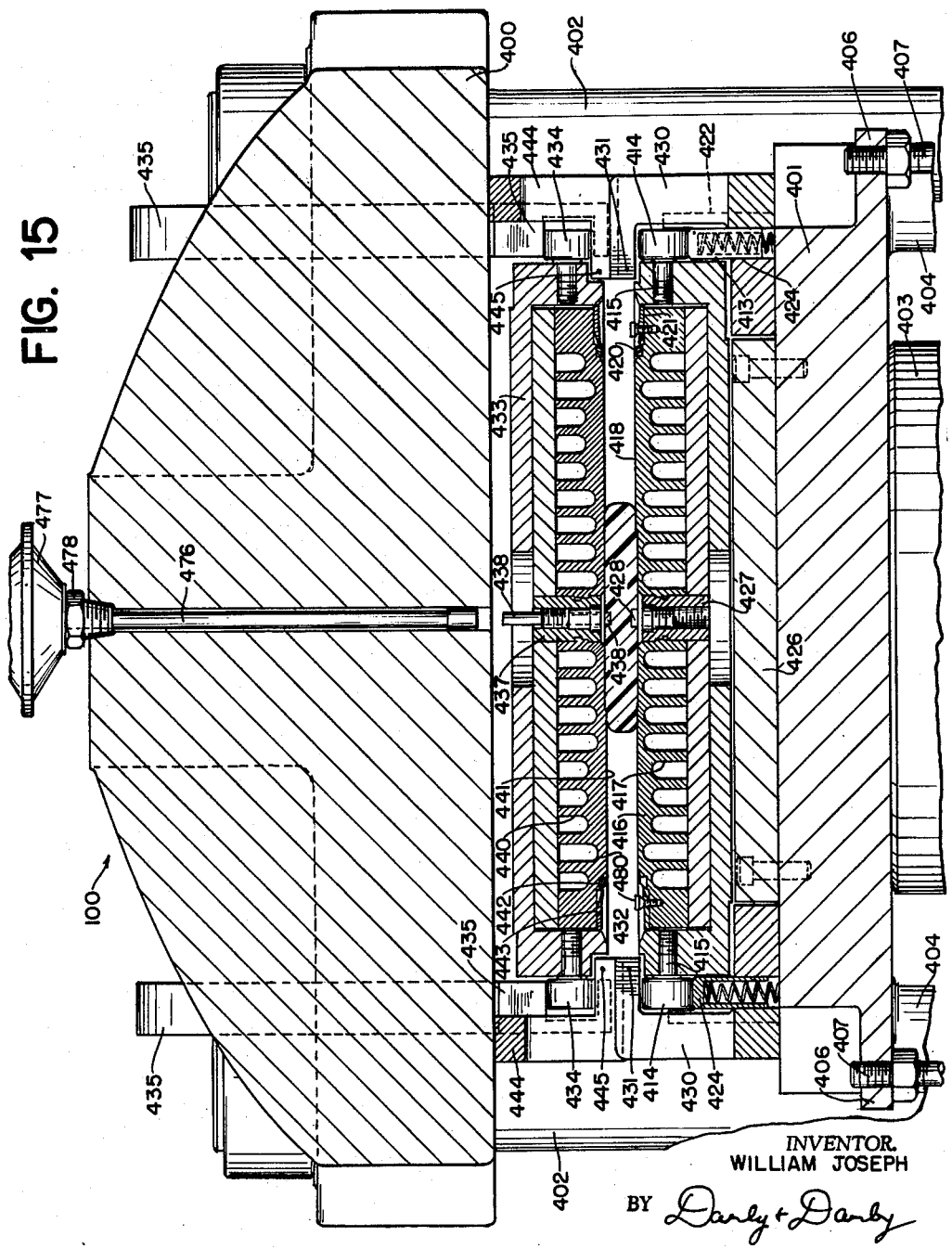

June 1, 1965 W. JOSEPH 3,186,029
MACHINE FOR MAKING DISK PHONOGRAPH RECORDS
Filed Aug. 23, 1962 19 Sheets-Sheet 11

INVENTOR
WILLIAM JOSEPH
BY *Darzoo Darby*
ATTORNEY

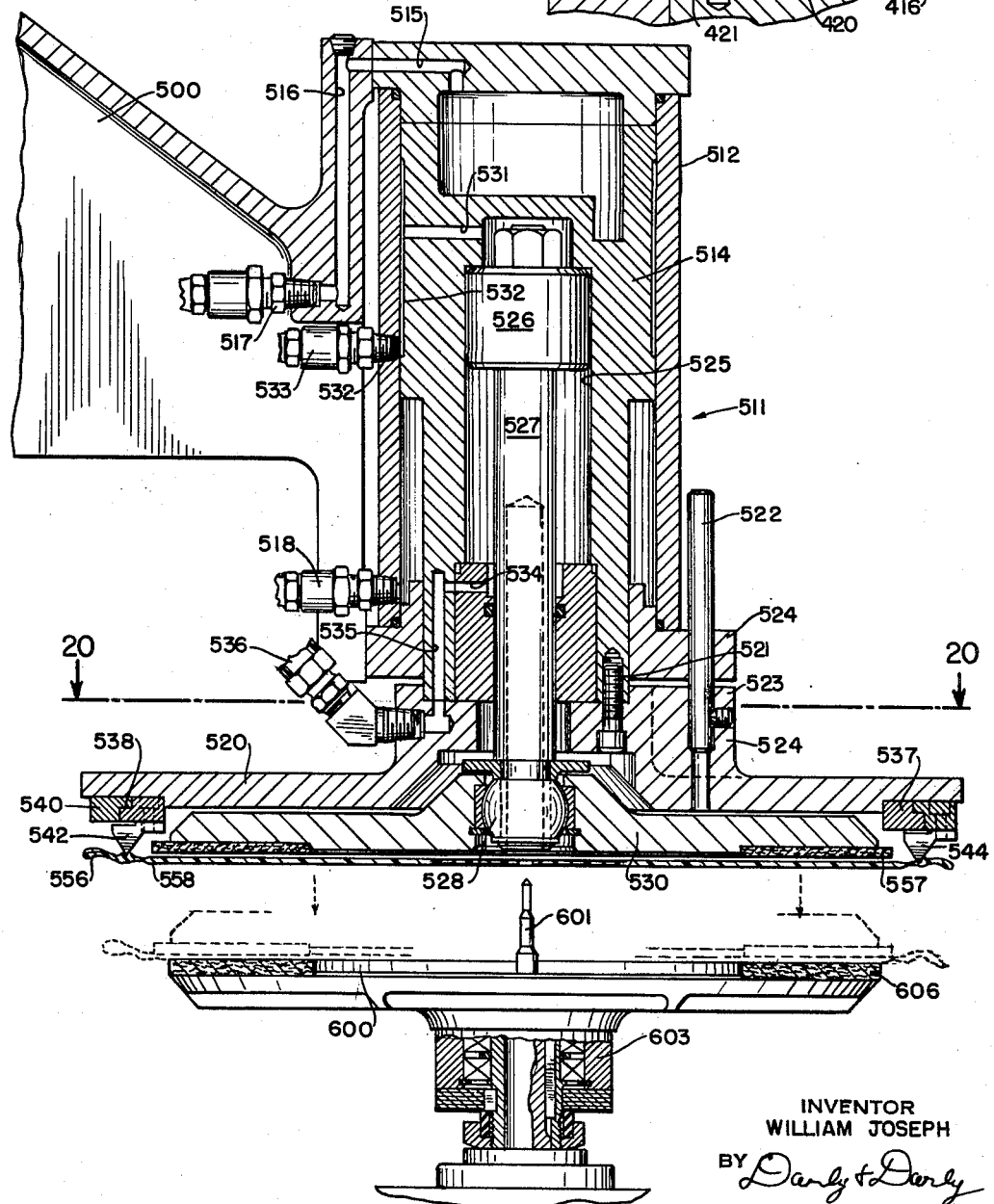

June 1, 1965     W. JOSEPH     3,186,029
MACHINE FOR MAKING DISK PHONOGRAPH RECORDS
Filed Aug. 23, 1962     19 Sheets-Sheet 13

INVENTOR
WILLIAM JOSEPH
BY *Darby & Darby*
ATTORNEY

June 1, 1965 W. JOSEPH 3,186,029
MACHINE FOR MAKING DISK PHONOGRAPH RECORDS
Filed Aug. 23, 1962 19 Sheets-Sheet 14
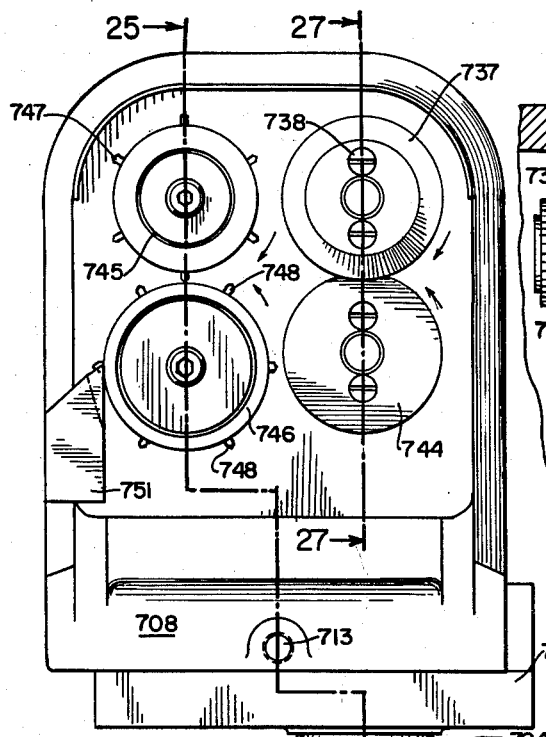
FIG. 24
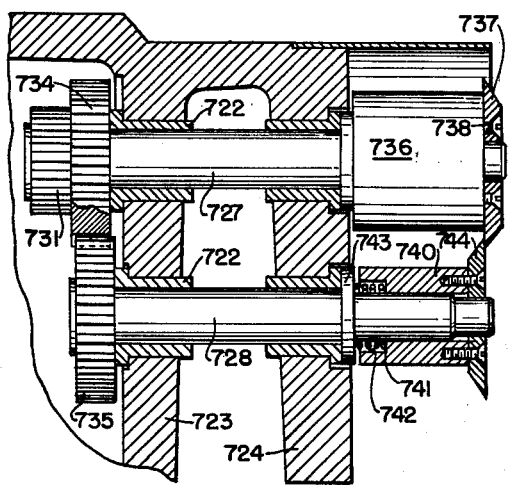
FIG. 27
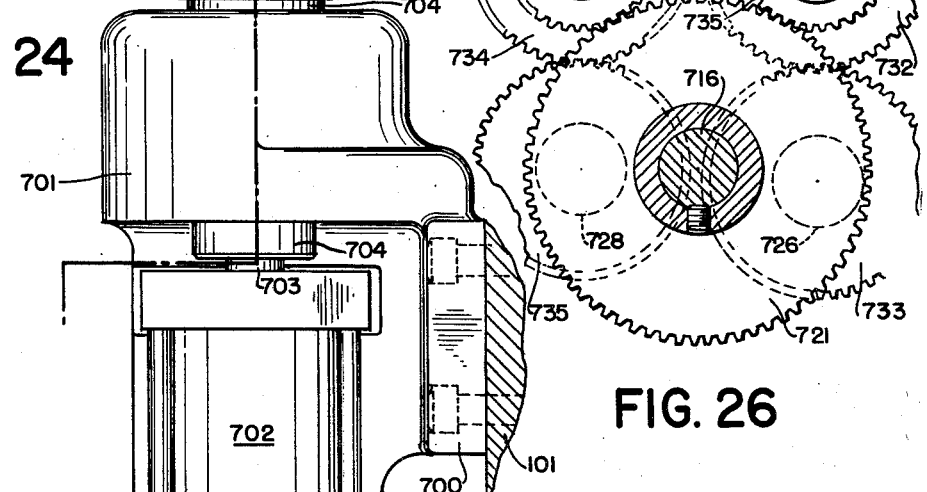
FIG. 26
INVENTOR
WILLIAM JOSEPH
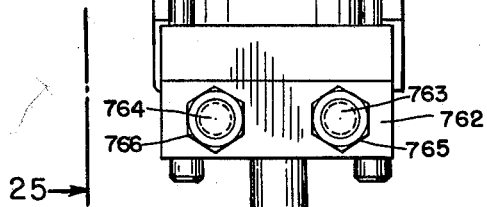
ATTORNEYS

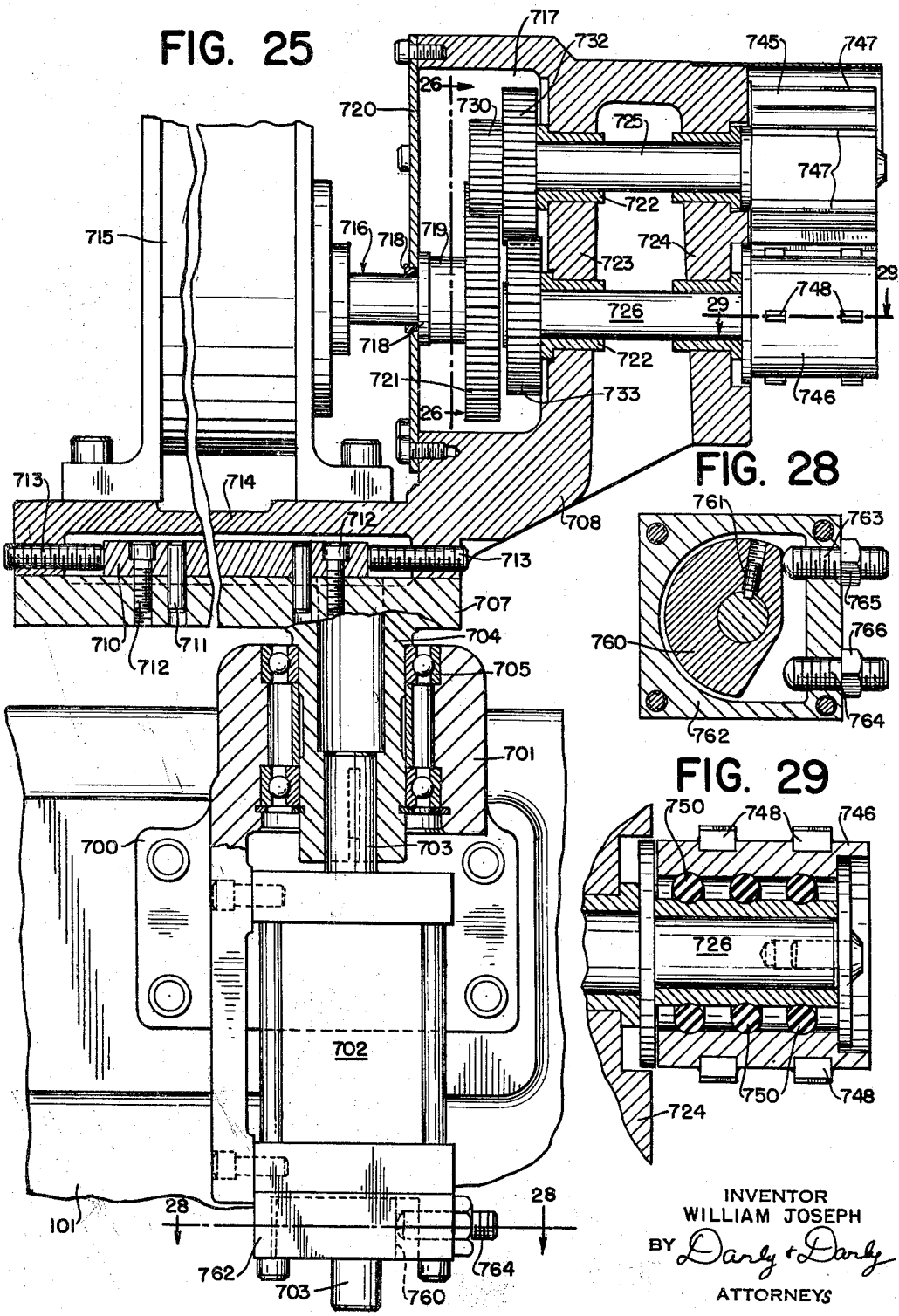

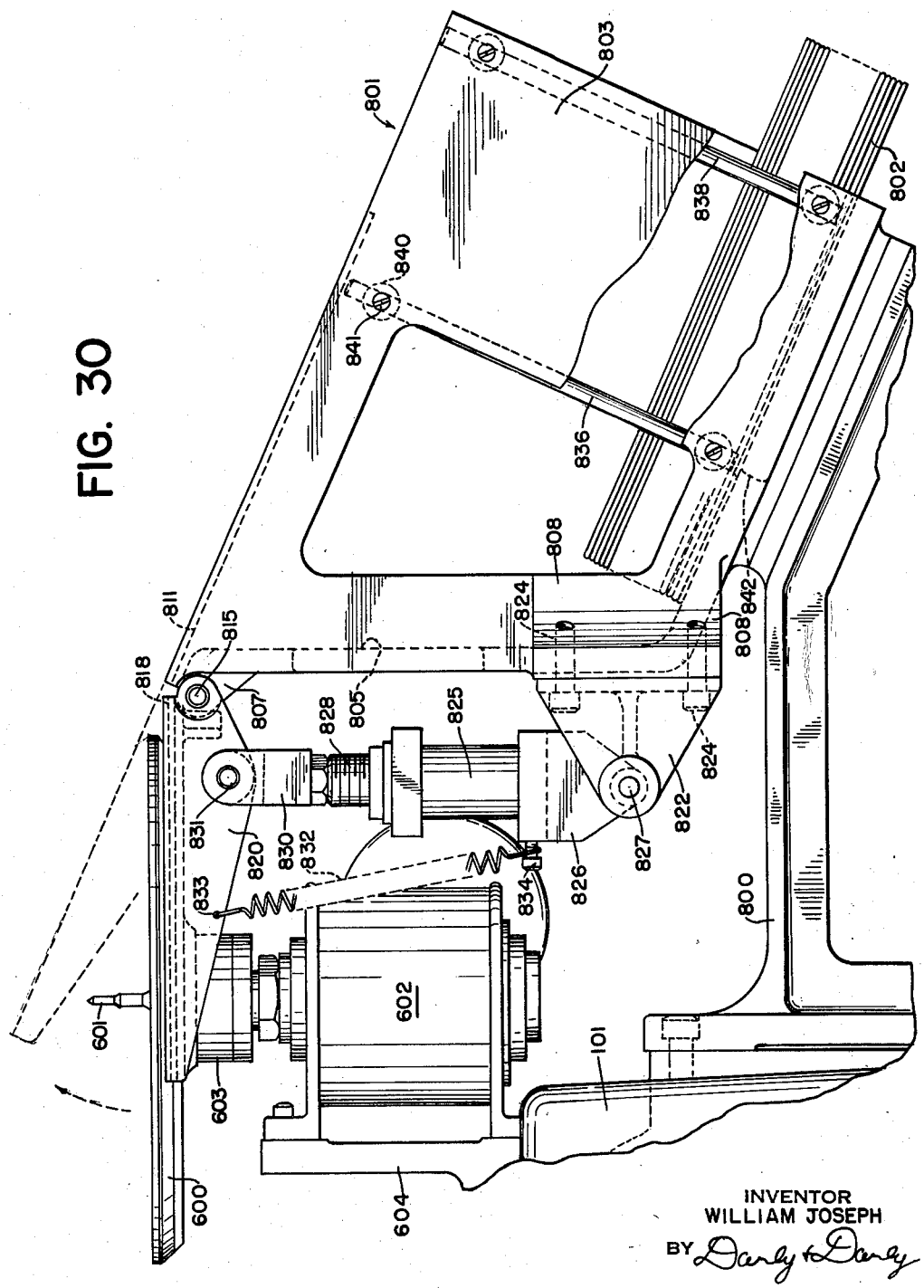

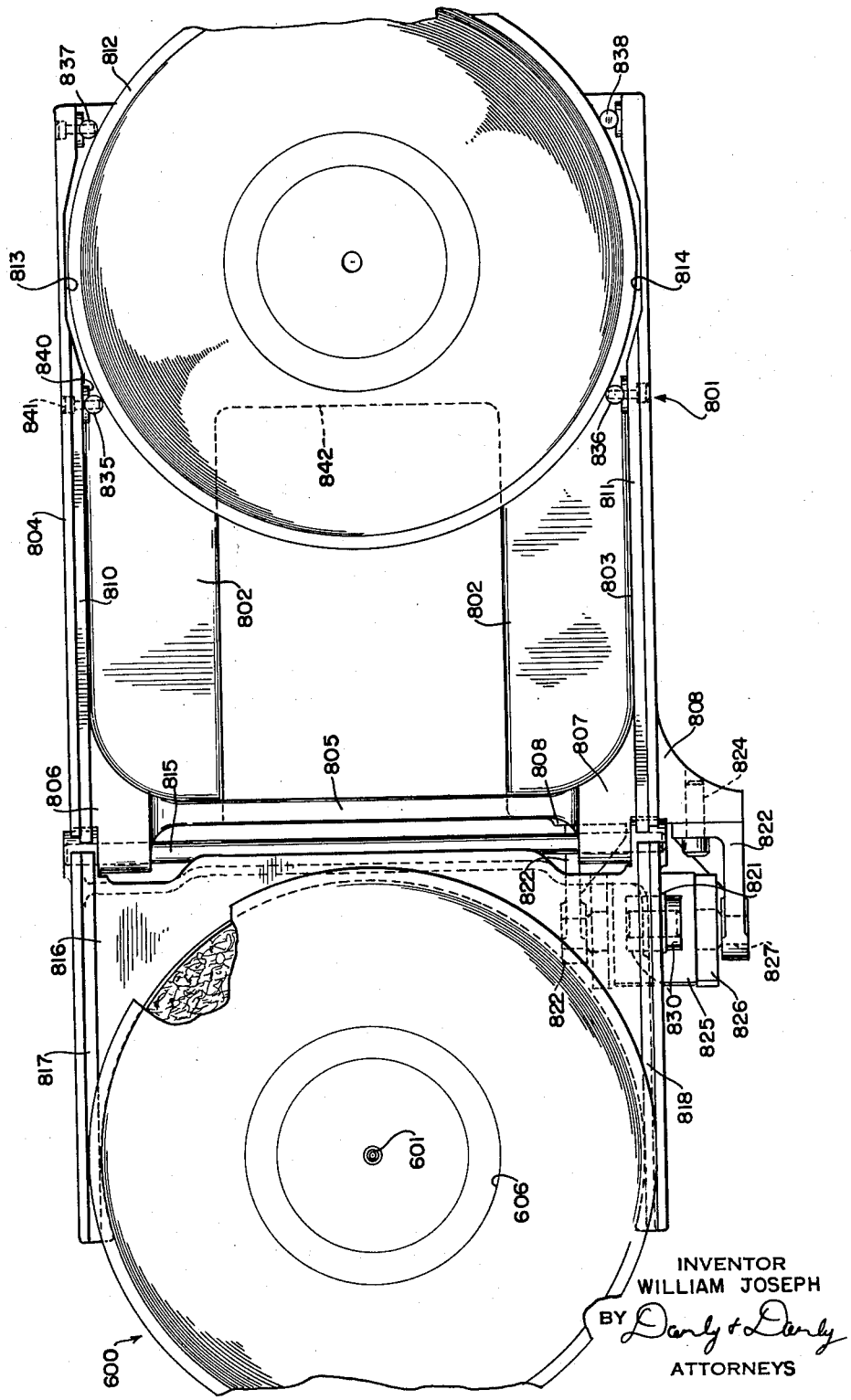

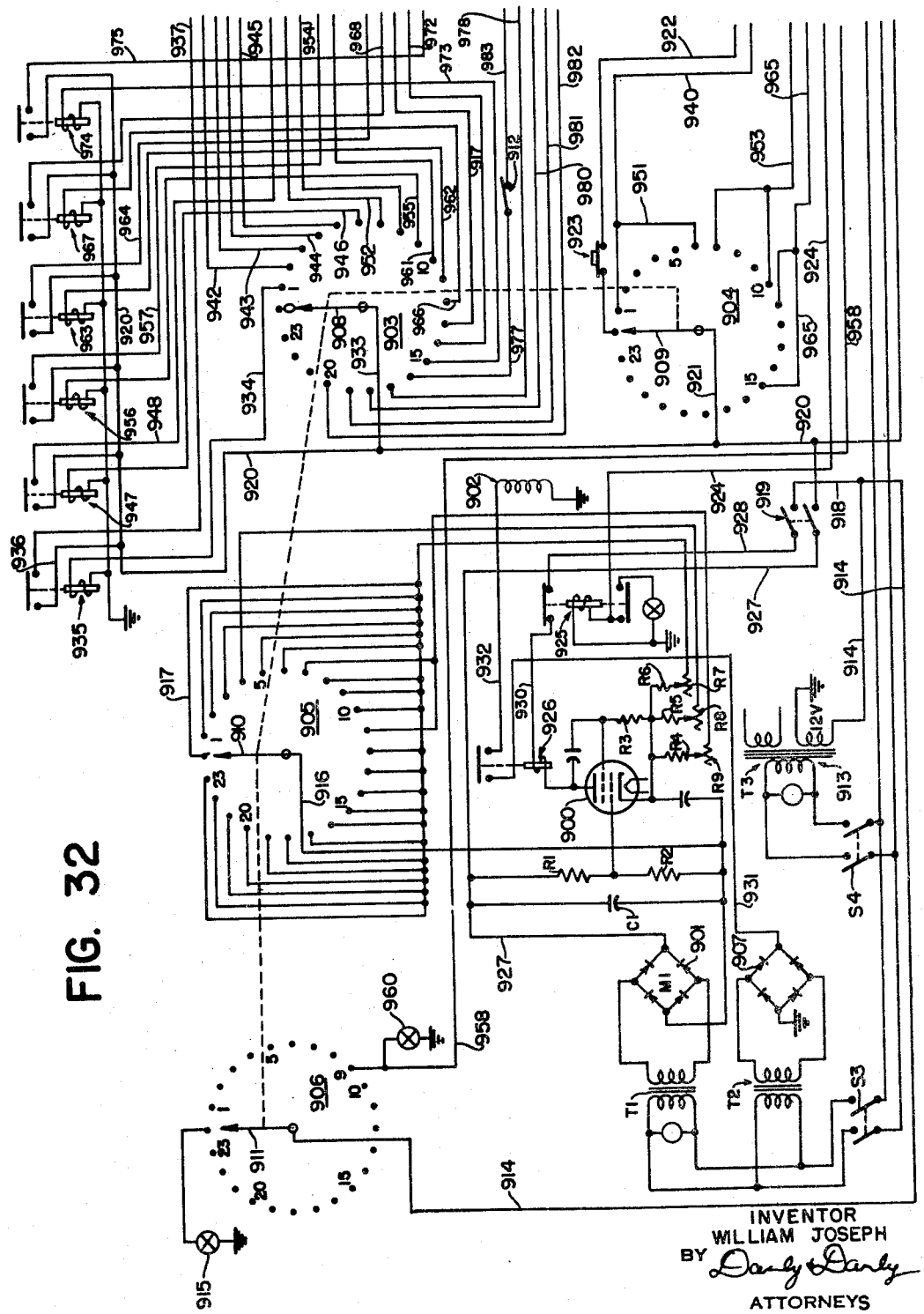

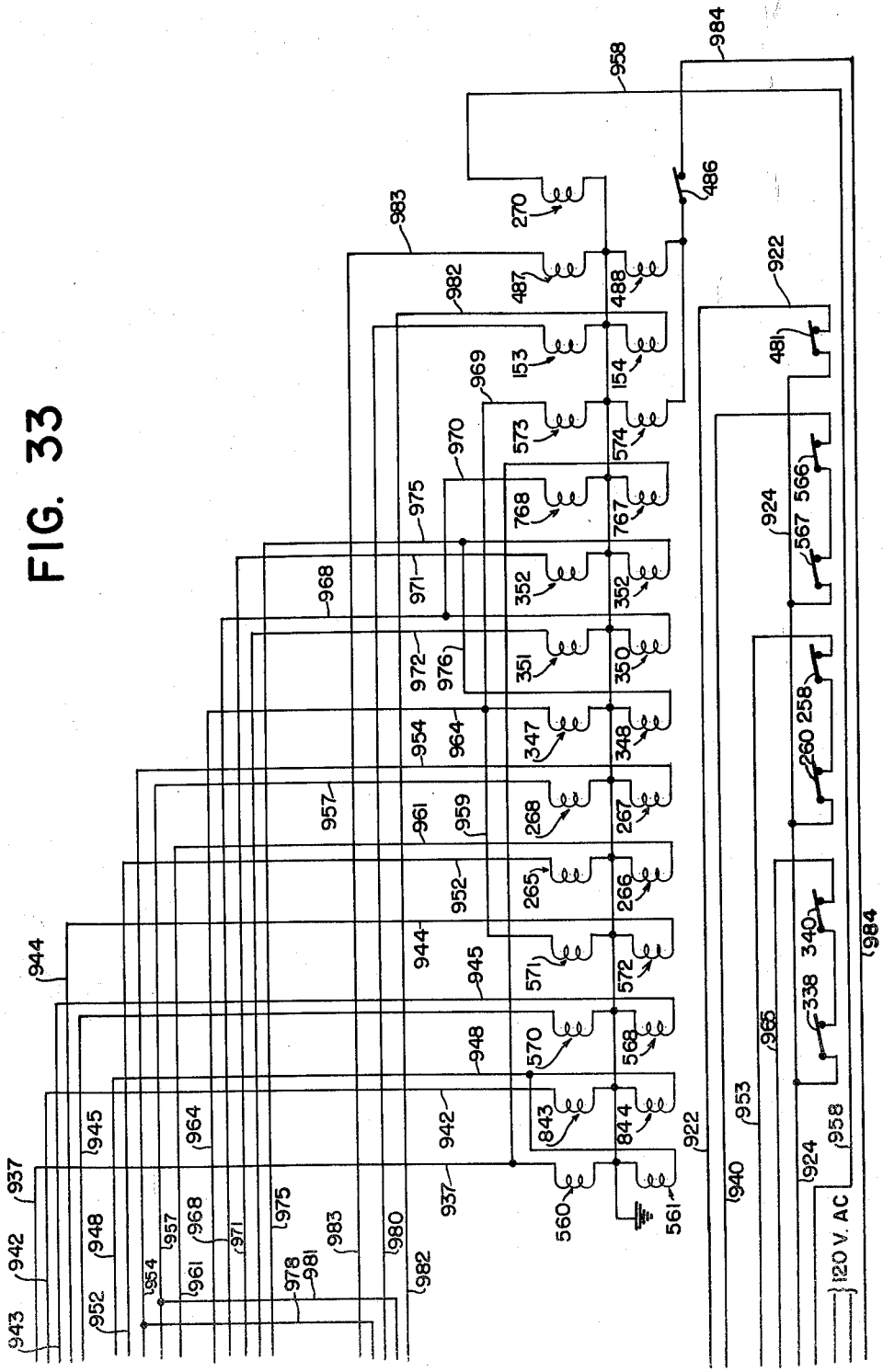

United States Patent Office 3,186,029
Patented June 1, 1965

3,186,029
MACHINE FOR MAKING DISK PHONOGRAPH RECORDS
William Joseph, Livingston, N.J., assignor to Metro-Goldwyn-Mayer Inc., New York, N.Y., a corporation of New York
Filed Aug. 23, 1962, Ser. No. 219,011
16 Claims. (Cl. 18—5.3)

The present invention relates to machines for making disk phonograph records and particularly to a machine which operates automatically to produce disk phonograph records in large quantities without the necessity of human intervention.

More particularly the machine of the instant invention is adapted to sequentially place a label in a proper central location on each of a pair of molds or stampers and to then transport a measured portion of plastic material from extruding nozzles to a position on the lower mold. Thereafter the mold parts are closed and placed between the platens of a hydraulic press which press is then operated through a timed cycle to form a disk phonograph record.

Next the mold parts are opened and the labeled record having flash thereon is removed from the lower mold and transported to a trimming table after which a set of trimming knives is engaged with the edge of the record and the flash removed. The flash as it is removed is cut into small pieces which can be readily inserted in the extruding mechanism hopper and reused and the trimmed record is automatically removed from the trimming table and transported to a final position at which a number of records are accumulated in a stack ready for removal and packaging.

At the present time it is the practice of the industry to form disk phonograph records by means of a press similar to the one used in the present invention. However, rather than having the press operate automatically the usual manner is to place a hopper of material adjacent to the press on one side and a trimming device adjacent the press on the opposite side, these machines being operated by an operator who takes a measured amount of record compound material from the extruding mechanism and after placing a label on each of the upper and lower mold parts, places the plastic material on the lower mold and thereafter operates a control handle to cause the mold parts to close and the press to be energized to press a record.

After the pressing operation has been completed, the operator removes the record having flash about its outer periphery, from whichever of the mold parts upon which it remains, and transfers it to a trimming turntable. Thereafter, under control of the operator the trimmer is energized and the flash removed and the operator then removes the trimmed record from the turntable and places it upon a truck or conveyor belt for transportation to a packing location. It will of course be understood that normally the trimming operation is performed on one record while a second record is being pressed.

From the above comparisons of the present practice and of my invention it will be seen that due to the use of the mechanism hereinafter discussed, the necessity of an operator is competely eliminated and records are produced automatically and without the labor costs currently incurred. It will be noted that in the present machine arrangements are made to assure that the pressed record is always retained by the lower mold which makes it possible to provide a mechanism for automatically removing a record from that mold and transporting it to the trimming table. When the press is manually operated no such provision is made and the operator has to remove the record from the particular mold part on which it is retained.

It is also to be noted that by use of the mechanism here disclosed, the labels are placed upon the upper and lower mold parts simultaneously thereby reducing the time required for producing the complete record. Furthermore, the operations are performed in a timed sequence which does not vary and thus also rate of production is increased.

It is an object of the invention to provide an automatic record making machine thereby eliminating the labor costs incident to manual operation of a record pressing device.

It is another object of the invention to provide such a record pressing machine which operates in a timed sequence to thereby produce records at an accelerated rate as compared with manual operation of a record press.

It is a still further object of the invention to provide mechanisms whereby labels are placed on the upper and lower mold parts of the record press simultaneously and wherein those labels are supplied from magazines in which quantities of such labels can be stored and readily available so that the machine need be stocked with labels at infrequent intervals.

It is a further object of the invention to provide a mechanism which transports plastic material in a measured quantity from an extrusion nozzle to the record press and wherein another mechanism removes the finished record together with the flash thereon from the press and deposits it at a trimming location at which a trimming knife is thereafter energized to remove the flash and prepare the removed flash for resoftening and reuse.

It is a still further object of the invention to provide such an automatic record pressing machine in which the timed sequence will be interrupted and the mechanisms stopped if, due to failure in any mechanism, there is danger of interference between the various mechanisms.

Other objects and features of the invention will be apparent when the following description is considered in connection with the annexed drawings, in which FIGURE 1 is a top plan view of the machine of the instant invention;

FIGURE 2 is substantially a side elevational view of the machine of FIGURE 1, this view being taken on the plane of the line 2—2 of FIGURE 1 thereby eliminating the record trimming knife mechanism from the view;

FIGURE 3 is a longitudinal cross-sectional view of one of the label magazines, the view being taken on the plane of the line 3—3 of FIGURE 1;

FIGURE 4 is a front elevational view of the label magazine of FIGURE 3;

FIGURE 7 is a vertical cross-sectional view taken on the plane of the line 7—7 of FIGURE 1 showing particularly the means for driving the label transporting arms between label pick-up position and label depositing position;

FIGURE 8 is a fragmentary vertical cross-sectional view taken on the plane of the line 8—8 of FIGURE 7 showing particularly the limiting and shock-absorbing mechanism used in the label arm drive means;

Figure 1:
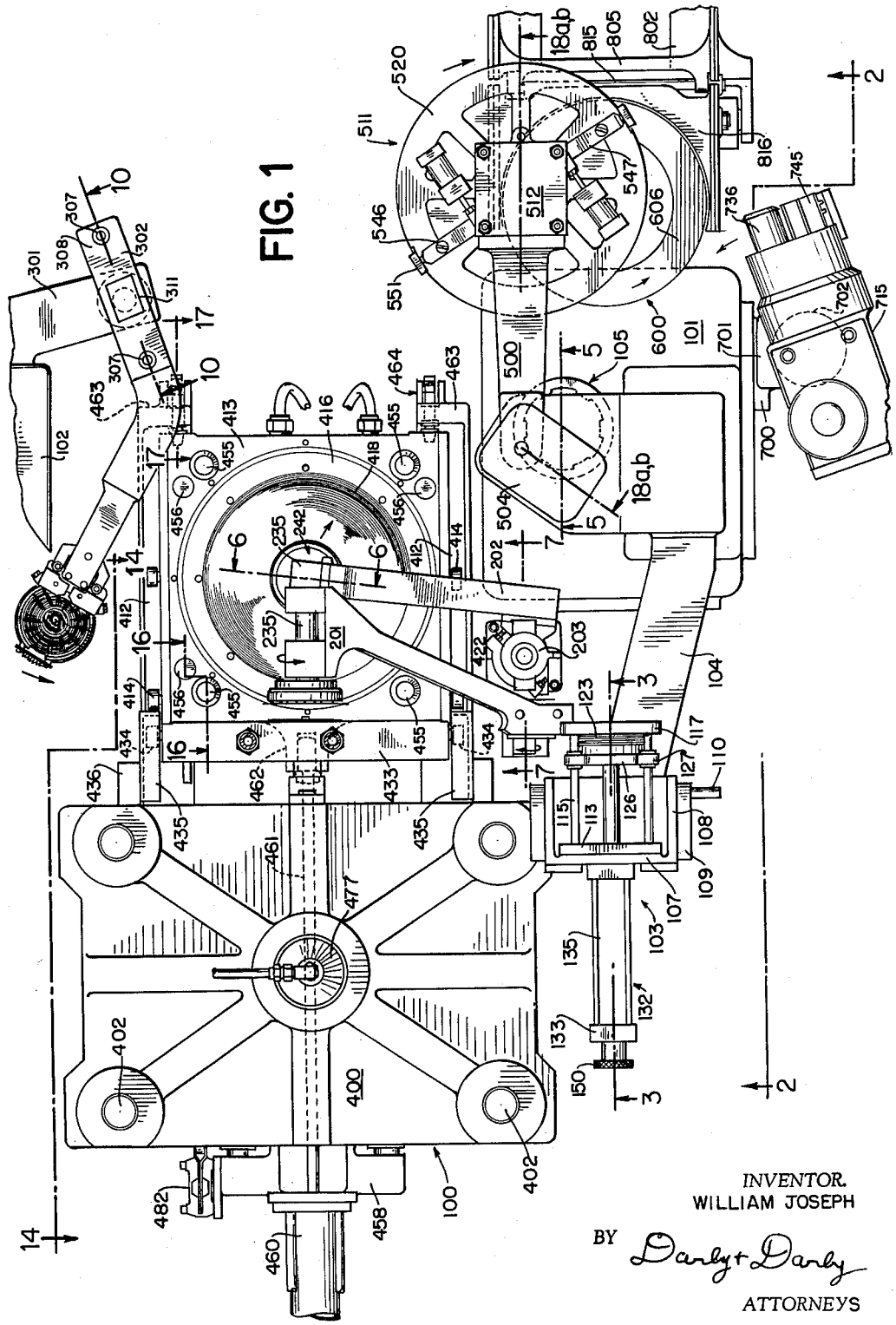

FIGURE 9 is a horizontal cross-sectional view of the common drive mechanism for the two label arms showing particularly a means for limiting the arc of oscillation of that drive means together with microswitches operated by cams on the label arm drive means to assure that succeeding operations of the mechanism do not occur unless and until the label arm has reached a particular one of its two end positions. This view is taken on the plane of the line 9—9 of FIGURE 2;

FIGURE 10 is a fragmentary vertical cross-sectional view of the material transporting arm showing particularly the means for supporting and oscillating that arm as well as the means for raising and lowering the arm, this view being taken on the plane of the line 10—10 of FIGURE 1;

FIGURE 10a is a cross-sectional view on the plane of the line 10a—10a of FIGURE 10 showing limit switches operated by the record material transporting arms to assure that this arm arrives at one of its limiting positions before successive operations can be performed.

Figure 18A:
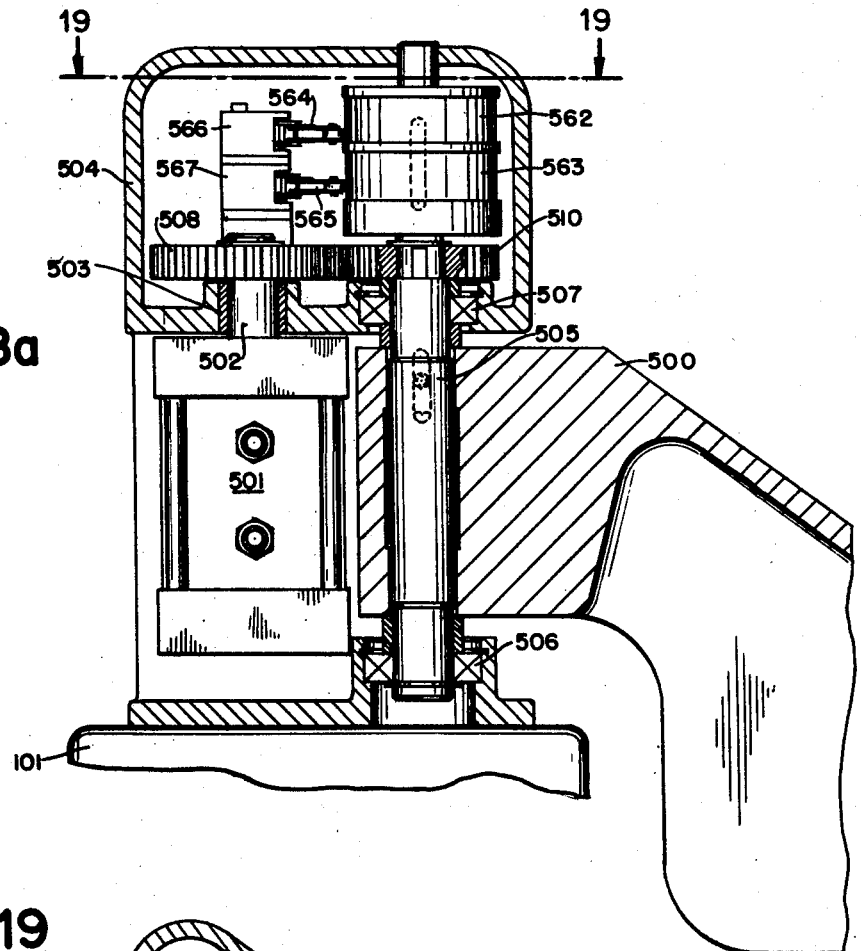
Figure 19:
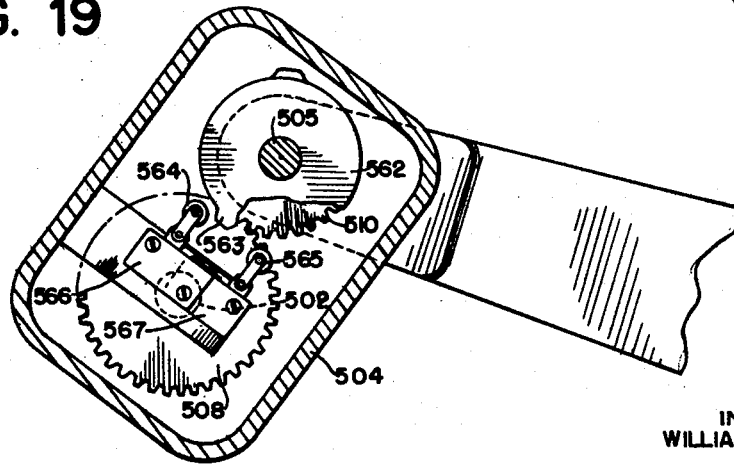

FIGURE 11 is a fragmentary top plan view of the material transporting arm showing the material receiving cup member in a closed position such as it occupies when accepting record material from the extrusion nozzle;

FIGURE 12 is a plan view similar to FIGURE 11 but being partly in section and showing the position of the cup parts when the record material is being deposited upon the lower mold;

FIGURE 13 is a vertical cross-sectional view of the arm of FIGURES 11 and 12 showing the relationship of the various portions of that arm and of the record material receiving and depositing member. This view is on the plane of line 13—13 of FIGURE 11;

FIGURE 14 is a fragmentary vertical cross-sectional view of the machine of FIGURE 1, the view being taken on the plane of the line 14—14 of that figure and showing particularly the mold assembly and the manner of opening and closing the molds and of moving the closed mold assembly into position between the press platens;

FIGURE 15 is a vertical cross-sectional view taken on the plane of the line 15—15 of FIGURE 14 and showing details of the mold and platen construction as well as details of the mechanism for assuring that the central aperture in the records be properly sized and formed;

FIGURE 16 is a detailed view showing the mode of hinging the upper mold half to the lower mold half together with means for locating the upper mold relative to the lower one when in closed position and for exerting pressure against the upper mold to cause it to separate from the lower mold when the timing mechanism calls for such separation. This view is taken on the plane of the line 16—16 of FIGURE 1;

FIGURE 17 is a vertical cross-sectional view taken substantially on line 17—17 of FIG. 1 and showing the details of the mechanism for absorbing shock as the mold assembly moves into its outermost position;

FIGURES 18a and 18b together comprise a vertical cross-sectional view of the record removing mechanism and the means which causes limited oscillatory movement of that mechanism from pickup position above the mold to depositing position above the trimming turntable. This view is taken substantially on the plane 18ab—18ab of FIGURE 1, but with the record removing mechanism at its limit of movement and in position to deposit a record upon the turntable;

FIGURE 19 is a horizontal cross-sectional view taken substantially along line 19—19 showing the drive mechanism for the record removing arm and particularly certain microswitches and cam operators therefor which are included in interlocking safety circuits to prevent conflict between operations of the record removing arms and other machine portions.

Figure 20:
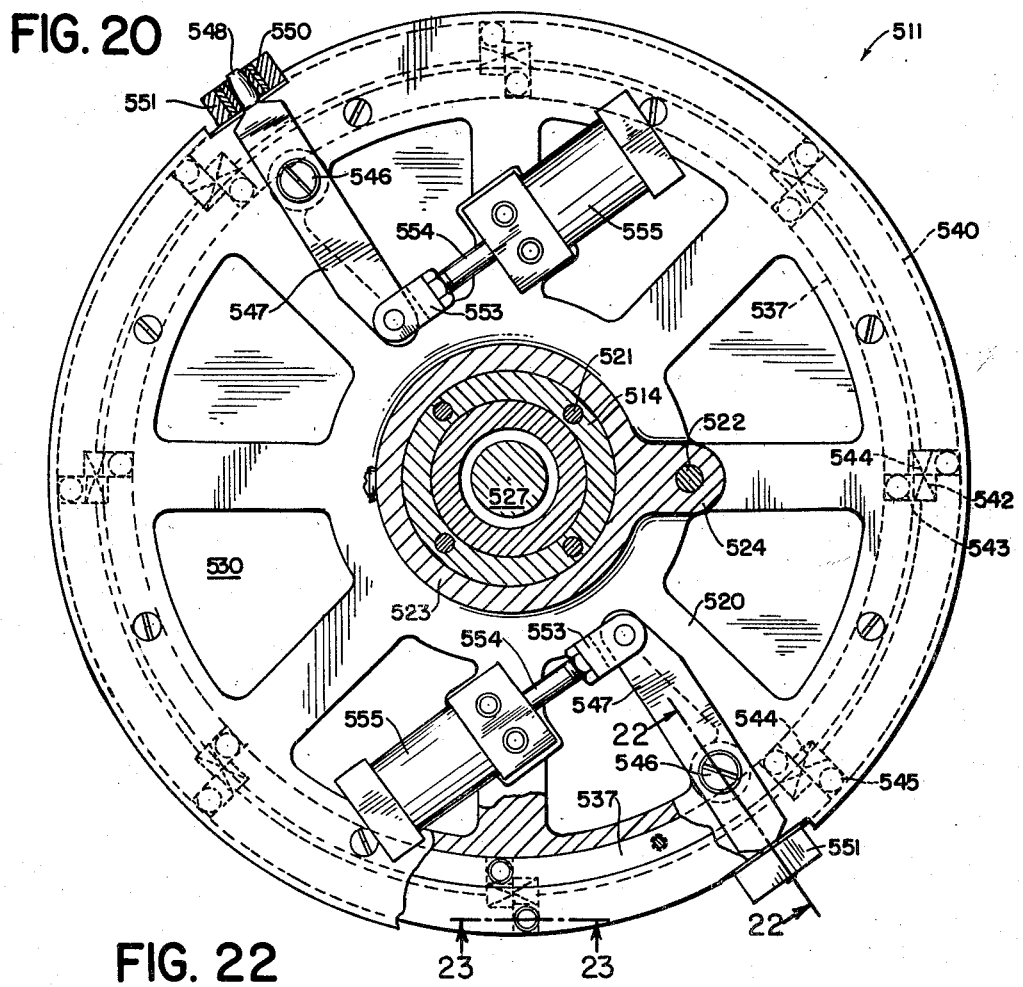

FIGURE 20 is a horizontal cross-sectional view of the record removing mechanism showing particularly the operators for a clamping ring and fingers which serve to clamp portions of the record flash to thereby lift the record from the mold and retain it during transport to position above the turntable and release to deposit the record on the turntable. This view is taken on the plane 20—20 of FIGURE 18b.

FIGURE 21 is an enlarged fragmentary view of a portion of the lower mold half illustrating the means by which a record is held to that mold half and indicating also the manner in which the record is clamped between fingers for removal from the mold.

Figure 22:
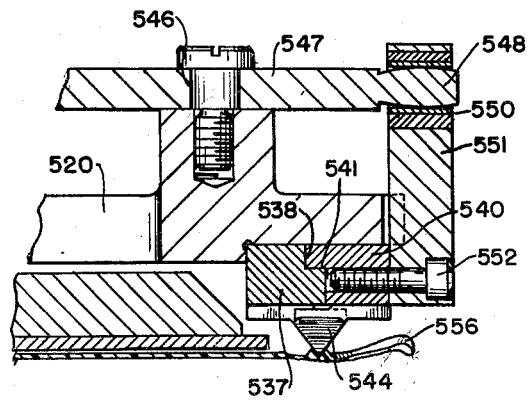
Figure 23:
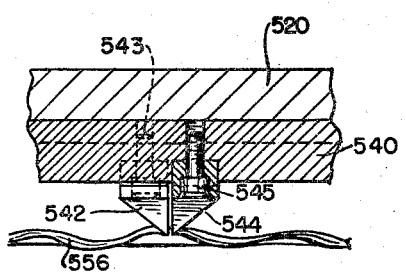

FIGURE 22 is a fragmentary vertical cross-sectional view taken on the plane of the line 22—22 of FIGURE 20 showing details of the operating mechanism for the clamping fingers;

FIGURE 23 is a fragmentary cross-sectional view taken on the plane of the line 23—23 of FIGURE 20 further illustrating the clamping fingers;

FIGURE 24 is a front elevational view of the flash trimming and flash breaking mechanism;

FIGURE 25 is a vertical cross-sectional view of the record flash breaking mechanism together with the drive means for rotating that mechanism and the record trimming mechanism into and out of trimming position. This view is taken on the plane of the line 25—25 of FIGURE 24;

FIGURE 26 is a fragmentary cross-sectional view taken on the plane of the line 26—26 of FIGURE 25 showing the arrangement of the driving gears for the flash trimming and flash breaking mechanism;

FIGURE 27 is a fragmentary vertical cross-sectional view of the flash trimming knives and the mounting and driving means therefor taken on the plane of the line 27—27 of FIGURE 24;

FIGURE 28 is a horizontal cross-sectional view taken on the plane of the line 28—28 of FIGURE 25 showing the means for limiting the oscillatory movement of the flash trimming and flash breaking mechanism into and out of operating position;

FIGURE 29 is a fragmentary vertical cross-sectional view of the lower flash breaking roller member taken on the plane of the line 29—29 of FIGURE 25;

FIGURE 30 is a side elevational view of the record trimming turntable including the tilting record discharge fork and the magazine for receiving completed records;

FIGURE 31 is a top plan view of the record turntable and magazine for finished records; and FIGURES 32 and 33 taken together are a schematic wiring diagram for the various timing switches, solenoids and relays.

Before proceeding with a detailed description of the machine and its various components, let it be stated that the description will take up the various components in the order in which those components are utilized in making a disk phonograph record, it being understood that when the machine is in full operation more than one record is being operated upon at any given instant and that the description relates to the manufacture of a single record without relating the mechanisms to their operation in the formation of a preceding or following record.

Only when timing and safety circuits are described will it become apparent which operations are performed upon two records simultaneously since only in that connection are such simultaneous operations of importance.

General organization

The machine consists generally of a press 100, FIGURES 1 and 2, to one side and forwardly of which there is a pedestal 101 on which the label magazines, label transporting arms, record removing arm and mechanism, trimming turntable, trimming cutters and discharge mechanism are mounted. In addition, slightly forwardly of the press and on the opposite side thereof is a second pedestal structure 102 seen in fragmentary view in FIGURES 2 and 10 on which the material hopper and extrusion nozzles, not shown, as well as the material transporting arm and mechanism are mounted.

Label magazines

Two label magazines are provided, both being mounted on the pedestal 101 (FIGURE 1). One of these magazines, designated 103, has its axis in a horizontal plane and is mounted by means of the arm 104, while the other, designated 105, extends vertically and is supported from the pedestal 101 by means not shown.

Since the label magazines are identical only one will be described in detail, this one being the horizontally extending one designated 103, details of which are shown in FIGURES 3 and 4. Magazine 103 is mounted on the arm 104 by means of a U-shaped bracket comprising the portion 107 forming the base of the U and the generally triangular portions 108 forming the arms of the U.

As indicated, the bracket comprising portions 107 and 108 is fixed to the arm 104 by means of the bracket arms 109, one at either side of the U-shaped bracket, the bracket arms being fixed to the bracket by means of the pins 110 and to the arm 104 by means of screws 111.

Adjustably fixed to the bracket portion 107 by means of screws 112 is a plate 113, the screws 112 extending through slots 114 in the plate 113 and into the bracket base 107. Extending horizontally from the plate 113 are three guide rods 115 which are equally spaced about the circumference of a circle. The ends of rod 115 extend into enlarged apertures in plate 113, the rods being held in position by screws 116 which extend through apertures in the plate 113 and are threaded into the ends of rods 115.

At the opposite ends a ring 117 is fixed to the ends of rods 115 by means of screws 118 in a manner exactly similar to that in which the first ends of the rods are fixed to the plate 113.

Fixed to the forward or right hand surface of the ring 117 by any suitable means such as screws 120 is a ring 121 having fingers 122 extending radially inward sufficiently far so that they hold the forward one of a stack of labels designated 123 against movement to the right. The labels 123 are provided with central apertures in the usual manner and a spindle 124 passes through these openings thereby keeping the records in alignment. Spindle 124 is provided with a head 125 which cooperates with the fingers 122 to prevent movement of the labels beyond the position determined by the fingers 122.

Mounted on the guide rods 115 for reciprocatory movement with respect thereto is a pressure block 126 which serves to compress the stack of labels 123 and to hold the forward label of the stack in position against the fingers as discussed above. The guiding is effected by means of projecting arms 127 on the block 126 which arms have bushings 128 in apertures therein, the bushings being mounted on the guide rods 115.

Threaded into a central opening in block 126 is a sleeve 130 which constitutes a connecting rod to the piston 131 of an air cylinder 132. Air cylinder 132 comprises the usual end members 133 and 134 together with the cylinder proper 135, the assembled parts being held in position by means of the rods 136 extending between end elements 134 and 135. An additional element 137 forms a cap or seal for the air cylinder at its right hand end, this cap element extending through an aperture in the mounting bracket member 107 and through an additional aperture in plate 113 and being held in position by means of a nut 138 placed on the threaded end.

As indicated above, sleeve 130 has a piston element 131 fixed thereto adjacent its left hand edge by any suitable means, in the particular instance by means of the nuts 140 and setscrew 141. The piston 131 includes the usual piston rings 142 which seal against the interior surface of the cylinder 135.

It will be noted that the end elements 133 and 134 are formed with fittings 143 and 144 into which air hose fittings 145 and 146 may be threaded.

The spindle 124 extends through the hollow sleeve piston assembly 130, 131, and is, at its left hand end, fixed in a central bore 147 in a large screw 148 having knurled head 150. The screw 148 is in turn threaded into an aperture 151 in the end member 133.

By this means the spindle 124 is rigidly supported and serves, due to the use of the bushing 152 in the right hand end of sleeve 130, as an additional guide for that sleeve and the pressure block 126 fixed thereto.

It will be seen that when air is admitted through the fittings 143 and 145 to the left end of the piston 131 the pressure block is forced toward the right as seen in FIGURE 3 and the labels on the spindle 124 are pressed against the inwardly extending fingers 122 as well as against the shoulder formed by head 125 of the spindle 124.

Conversely, when air is admitted through fittings 144 and 146, and exhausted from the left end of the piston 131 through fittings 143 and 145, the piston moves to the left releasing the pressure and freeing the outermost label, that is, the right hand label as seen in FIGURE 3 for removal by a label transporting arm as will shortly be described.

*Label transporting mechanism*

As has been indicated, it is desirable that a label be placed on each of the mold halves before the record material is deposited and the record pressed. The mode of operation of the label magazines has been described above. These magazines cooperate with label transporting mechanism which for each cycle of operation of the record pressing machine takes a label from each of the two magazines and deposits it upon one of the two mold parts. The label transporting mechanism is shown in FIGURES 1, 2 and 5 through 9.

Referring now to FIGURES 1 and 2, the two label arms are designated 201 and 202, the arm 201 cooperating with label magazine 103 and arm 202 with label magazine 105. Since the label arms are identical only one is shown in detail in FIGURES 5 and 6, this being the arm which cooperates with the magazine 105. It will, however, be understood that the label transporting mechanism of the arm 201 is identical with that of the arm 202 and cooperates with the magazine 103 in the same manner as the mechanism of arm 202 cooperates with magazine 105.

Referring now to FIGURES 2 and 7, it will be seen that both label transporting arms are mounted upon the pedestal 101 by means of the supporting arm or bracket 106. The bracket 106 supports the label transporting arms 201 and 202 together with the driving mechanism for oscillating those arms one, 202, about a vertical axis and the other, 201, about a horizontal axis.

Fixed to the top of the bracket or arm 106 is a casting 203 which carries bearings 204 and 205 in which a vertical shaft 206 and a horizontal shaft 207 are journalled. The shaft 210 of a rotary air motor 208 through the medium of coupling 211, drives shaft 206. Shaft 207 is driven from shaft 206 by means of the bevel gears 212 and 213.

The movement of the shaft 206 is limited by means of stop member 214 (FIG. 9) fixed to the lower end of the motor shaft 210 by means of a setscrew 215 and arranged in alignment with the adjustable screws 216 by means of which the degree of rotation of the shaft 210 can be determined, the screws being threaded through the casing 217 and being held in adjusted position by means of the lock nuts 218.

The arm 201 is mounted on the shaft 207 through the medium of a shock absorbing mechanism. This shock absorbing mechanism comprises a block 220, FIGURES 7 and 8, having a bore 221 therein which fits about the shaft 207. Block 220 has an enlarged bore 222 therein at one end thereof. Inserted into the bore 222 is a metallic sleeve 223 which sleeve is milled out to form sectors at the end remote from the bore 221 as indicated particularly in FIGURE 8. The sleeve 223 is fixed for rotation with the block 220 by means of the pin 224. Four rubber sectors 225 are placed in the milled sector slots in sleeve 223, each slot accommodating two of the rubber sectors which are separated by means of a vane 226 extending through a diametrical slot 227 in the shaft 207.

Thus as shaft 207 oscillates the vane or key 226 bears against one of the sectors 225 which in turn bears against a side of one of the sectors of the sleeve 223 and through the pin 224 drives the block 220. As is best seen in FIGURE 8, the oscillation of the block 220 is limited due to the provision of stop screws 228 which are adjustably fitted into a portion 230 of the casting 203 and cooperate with flattened portions 231 of the block 220.

Although the shock absorbing mechanism has been described in connection with the shaft 207, it will be understood that the arm 202 is driven by shaft 206 through an exactly similar shock absorbing mechanism which is therefore no described.

The arm 201 is provided with a surface 232 which mates with surface 233 of the block 220, the arm then being fastened to the block by means of the screws 234. The arm 202 is fixed to its block 220 in exactly the same manner. At the outer end of each arm a mechanism which takes a label from the magazine and deposits it on a central pin of the cooperating mold is mounted. Again, since these mechanisms are exactly similar only one will be described, this being the one which, as indicated hereinabove, cooperates with the vertically disposed label magazine 105.

Figure 6:
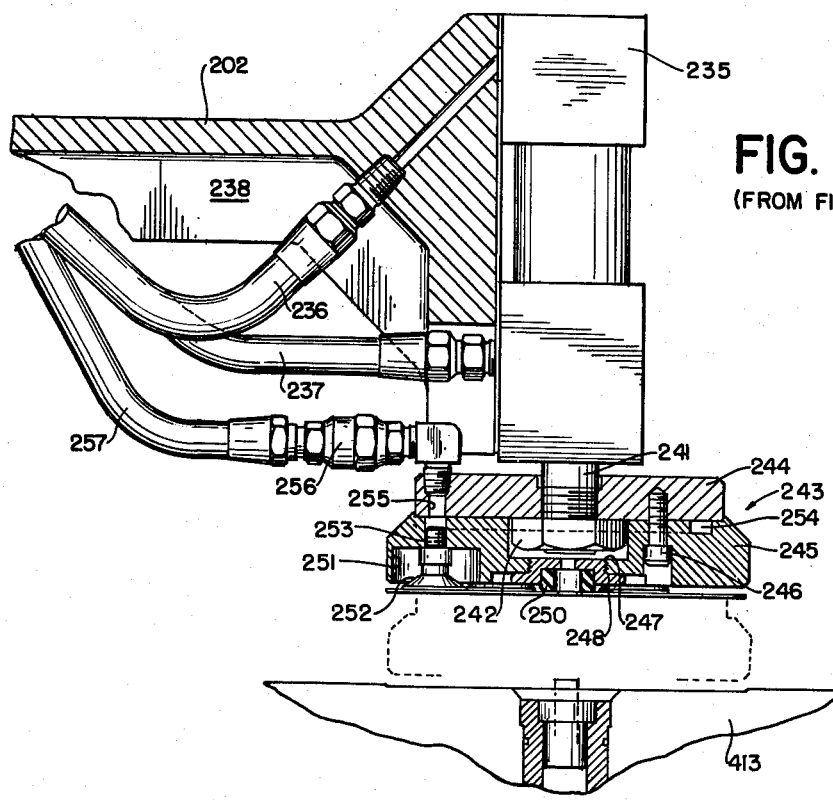
FIGURE 6 is a similar vertical cross-sectional view of the label transporting mechanism showing the mechanism in position above the mold ready to deposit a label upon the lower mold. This view is taken on the plane of the line 6—6 of FIGURE 1.

At the outer end of the label transport arm is an air cylinder 235, FIG. 6, this being the usual double acting air cylinder and being supplied with air on either side of its piston by means of the flexible hoses 236 and 237 which hoses pass through the channel portion 238 of the arm 202 and through an aperture 240 in the inner end of the arm and thence are connected by flexible hoses, not shown, to piping which is disposed in the pedestal 101.

Fixed to the piston rod 241 of the air cylinder 235 by means of the nut 242 is the label head 243. The head 243 comprises a disk 244 fixed to the piston rod 241 in the manner already described, and to which is fixed a second disk 245 by means of the screws 246. Disk 245 is provided with a central cavity 247 providing space for the nut 242. It is also provided with a threaded opening in which a washer 248 carrying a bushing 250 is threaded. The bushing 250 cooperates with the magazine spindle 124 and with a central die in the mold as will later be described.

Disk 245 is also provided with a plurality of cavities 251 in which vacuum cups 252 are placed, these cups extending slightly below the lower face of the disk 245. The vacuum cups 252 are flexible rubber cups and are fixed to the lower end of hollow fittings 253 which are threaded into the base of the cavities 251 in the disk 245. Each of the hollow fittings 253 communicates with an annular passage 254 in the upper face of the disk 245. A passageway 255 in the upper disk 244 also communicates with the annular passage 254 and with a fitting 256 which forms the termination for a vacuum hose 257 which connects to a pipe in the pedestal 101 following the same course as do the hoses 236 and 237.

Figure 5:
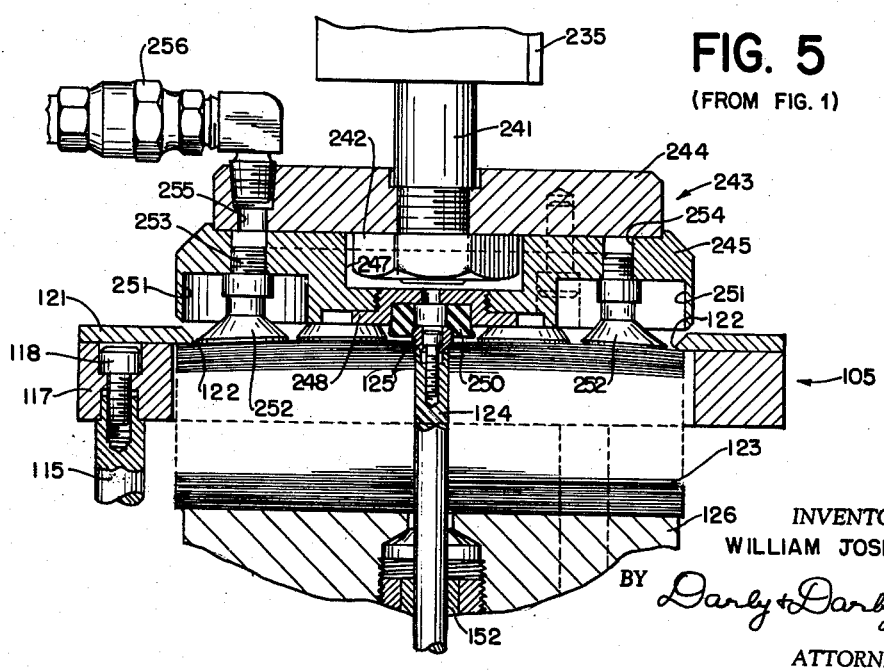
FIGURE 5 is a vertical cross-sectional view through one of the label transporting mechanism, this view being taken on the line 5—5 of FIGURE 1 and showing the mechanism in position to take a label from the cooperating magazine.

In FIGURE 5 the vacuum head is shown in the position which it occupies when a label is to be taken from the stack in the cooperating magazine 105. It will be noted that at this time the vacuum cups 252 are against the uppermost label in the stack. At this time also, as will be described, the line or hose 257 is connected through a valve to a source of vacuum and the first label is therefore held to the head and caused to move upwardly with the head when pressure is applied through the hose 237 to the underside of the piston of air cylinder 235.

At this time also in a manner later to be described, the pressure block 126 is released so that the labels are no longer under pressure and the upper label can therefore be pulled out from its position behind the finger 122 and off the head 125 of the spindle 124. This action is aided by the fact that the vacuum applied to the cups 252 causes a minor wrinkling of the label and a decrease of its outer diameter and additionally forms the label into a form which is concave upwardly.

Once the uppermost label has been released from the stack by virtue of the operation just described, the rotary air motor 208 is caused to oscillate causing both arms 201 and 202 to move from position in line with their respective label magazines into position in line with the axis of the respective mold part after which pressure is admitted to the air cylinder on the upper side of the piston in the case of arm 202 causing the head to move into position against the mold at which time the vacuum to the cups 252 is momentarily cut off and the label deposited upon the mold with the central opening of the label aligned with the mold due to the fact that a central pin or die in the mold enters the bushing 250 to assure this alignment.

In order to assure that the label arms are fully aligned with the corresponding mold parts before the label head moves down and in order also to assure that the label arms are out, that is, in alignment with their respective magazines, before the record material transporting arm moves in, a pair of microswitches 258 and 260 is provided as indicated in FIGURE 9, the switches being one beneath the other in that view, the operating members thereof being designated 261 and 262. These operating members cooperate with cams 263 and 264 respectively, operating element 261 being operated to momentarily open switch 258 and a control circuit as the label arm approaches its fully "in" position and operating member 262 operating its corresponding switch to cause momentary opening of the contacts when the cam 264 and the label arms 201 and 202 approach their fully out position (clockwise as viewed in FIGURE 9).

*Extrusion and material transporting mechanism*

As has been indicated above, the material of which the records are formed, such for example as a vinyl plastic material or compound, is supplied through extrusion nozzles from an extrusion mechanism of usual form which is shown rather schematically at 109 and which is mounted upon the pedestal 102. The extrusion nozzle, rather than having a single central opening as is common, has a plurality of passageways 155 arranged as a conical frustum. By use of the conical arrangement the material is deposited in the transporting cup later to be described in individual "strings" 156 in such manner that a cavity 157 is formed in the upper part of the deposited material which provides a passageway through which the volatile gases may escape.

Also mounted upon the pedestal 102 by means of a bracket 301 is a record material transporting mechanism which serves to take a measured amount of the record forming material and deposit it upon the lower die.

The material transporting mechanism comprises an oscillatable arm 302, this arm being supported on a shaft 303, FIGURE 10, journalled in bearings 304 in the bracket 301. The shaft 303 is coupled to a rotary air cylinder or Robotac 305 in any suitable manner, the amount of oscillation being determined by the internal construction of the Robotac.

Arm 302 is mounted on the shaft 303 though the medium of a supporting plate 306 having a pair of guide rods 307 fixed thereto which rods at their upper ends are held in proper spaced relation by means of the upper plate 308. Arm 302 is provided with bushings 310 in spaced openings therein conforming to the spacing of the rods 307 and thus providing for sliding up and down movement of the arm 302 with respect to the plates 306 and 308 and the shaft 303.

An air cylinder 311 of usual form is fixed in the upper plate 308, the piston rod thereof being connected by means of the threaded portion 312 to the arm 302. In the upper position of the arm 302 it receives material from the extrusion nozzles while in the lower position thereof it deposits the received material upon the lower mold in position to be pressed to form a record.

Arm 302 is, as is clearly indicated in FIGURES 10, 11, 12 and 13, formed as a channel. An air cylinder 313 is disposed in this channel and serves to actuate the mechanism for depositing a received portion of record material upon the mold. Supported at the outer end of the arm 302 is a pair of semicylindrical members 314 having extensions 315 pivotally mounted on pins 316 fixed in apertures in the bifurcated outer end 317, see FIGURE 13, of arm 302. Also pivotally mounted on pins 316 are the blocks 318, these blocks having cutout portions thereof through which the extensions 315 extend. The blocks 318 have extensions 320 thereon provided with slots 321 and a yoke 322 fixed to the piston rod 323 of the air cylinder 313 is provided with pins 324 which extend into these slots. Each block 318 is also provided with a pin extending therethrough in a vertical direction, these pins being designated 325 and cooperating with slots 326 in the corresponding extension 315.

Each block has affixed thereto on its underside an arcuate member 327, these arcuate members being provided with inwardly radially extending lugs 328 which serve to retain material discharged into the device in position during transport from the loading position to the discharge position. The material, however, is not held by these lugs 328 during discharge from the extrusion nozzle, but is rather deposited on the table 330 which is a portion of the pedestal 102 and is shown only in FIGURE 13.

Each block 318 also has a boss 331 formed on its outer surface which boss together with a portion of the block is tapped to receive a screw 332, the inner end of which bears against the corresponding extension 315 and thereby limits the inward motion of the members 327 with respect to the members 314.

The cylindrical members 314 together with the arcuate members 327, and the lugs 328 thereon thus together form a cup having a partial bottom, into which material is deposited from the extrusion nozzle as mentioned above, the material resting in large measure upon the table 330 but being partially held by the lug 328. Table 330 as well as members 314 and 327 forming a material receiving cup are coated with Teflon to assure that the record material or compound will not adhere to the cup.

Each of the semicylindrical members 314 is provided with a boss 333 near its terminal end, these bosses having flat faces and being tapped to receive screws 334. A link 335 extends between the screws 334, this link being slotted as shown at 336 and the two screws having a spring 337 stretched therebetween. The slots 336 in link 335 are of such length that the outer ends of members 314 may come together and this is in fact the normal position when the air cylinder is operated so that its piston is in the left hand position prior to extrusion of material into the cup. The slots 336 in link 335 and the slots 326 in extensions 315 permit slight outward movement of the members 314 as material is deposited in the cup, the position of the parts under these circumstances being that indicated in FIGURE 11.

The operation of the material transporting arm thus far described is obvious from a consideration of FIGURES 10, 11 and 12. At the moment when extrusion begins the arm has been rotated to its extreme clockwise position as seen in FIGURE 1 and the arcuate members 327 are positioned just above the table 330 and these members, as well as the semicylindrical cup members 314 are closed to the maximum possible extent. As material is extruded into the cup the members 314 move outwardly to the position shown in FIGURE 11.

After the extrusion operation has been completed and the desired measured amount of record material deposited in the cup, the Robotac 305 is energized and the arm rotated counterclockwise into a position in which the cup member lies immediately above the lower mold and is centered with respect to the lower mold. At this time the air cylinder 311 is supplied with air above its piston thereby causing the arm to move from the position shown in FIGURE 10 in full lines to that indicated in dotted lines. This places the cup immediately above the mold, it being understood that a label has already been deposited upon both the upper and lower mold halves as described hereinabove. Next the air is admitted to the air cylinder 313 to urge its piston to the right and as the piston and yoke 322 fastened thereto move to the right the blocks 320 pivot about pins 316 and cause the members 327 to open. As these members move pins 325 move in the slots 326 until the ends of the slots are reached at which time the semicylindrical members 314 are also caused to pivot about the pins 316 and to open slightly. The result of these opening movements of members 314 and 327 is to deposit the record material which is still in a plastic condition and quite warm upon the lower mold half. The air cylinders 313 and 311 as well as Robotac 305, are then supplied with pressure fluid on the opposite sides of their respective pistons causing the material transporting arm to move upwardly and either simultaneously or shortly thereafter to rotate in a clockwise direction until the cup again is in position to receive material and is closed.

In order to assure that the material transporting arm be in complete alignment with the lower mold half before the arm moves downwardly to deposit the record compound upon the mold, a switch is provided to momentarily open a circuit preventing the downward movement unless and until the arm has reached the desired position. This switch is shown at 338 in FIGURE 10a and has an operating member 341 which cooperates with a cam 342 fixed to a lower extension 343 of the shaft of the rotary air motor 305. The switch 338 is supported upon a bracket 344 fixed to the lower end of the rotary air motor 305. A second microswitch 340 is fastened to the lower surface of the switch 338 and has an operating member 345 which cooperates with a cam 346 to cause momentary opening of the microswitch contacts as the material transporting arm approaches its position under the extruder nozzle. This prevents the mold parts from closing and moving into the press unless and until the material transport arm has moved completely away from the mold parts.

*Molding press*

The molding press and cooperating molds, and molding matrices or stampers are shown particularly in FIGURES 1, 2, 14, 15, 16, 17 and 21.

The molding press is generally indicated by 100 and is of the type normally used for manual record pressing. It comprises the upper and lower platens 400 and 401, FIGURE 15, the upper platen 400 being held in fixed position at the top of the standards 402, and the lower platen resting upon the piston or ram element 403 of a hydraulic cylinder, as shown in FIGURES 14 and 15. Platen 401 is provided with extensions 404 having bushings 405 therein which serve to guide the platen for reciprocation on the standards or rods 402.

In the usual manner platen 401 is provided with a lug on either side thereof designated 406 which lugs provide anchoring points for rods 407 which extend through corresponding lugs 408 on the cylinder 410 of the hydraulic ram as well as through springs 411, the rods 407 passing through lugs 409 at the lower ends (FIG. 2). This is the common arrangement and constitutes the means for returning the platen together with the ram 403 to its lower position when the hydraulic pressure is released.

Mounted on the lower platen 401 at either side thereof is a track 412 on which a mold carrier 413 is mounted for reciprocatory movement into and out of pressing position, the mounting means constituting the rollers 414 mounted on the studs 415. Mounted in the mold carrier 413 is the mold 416 which mold, in the usual manner, has passageways 417 formed therein through which heating and cooling fluid is circulated during the molding operation. The mold matrix or stamper 418 which carries the sound grooves is mounted on the mold 416 and is held in position by being gripped between the coining ring 420 and the retaining ring 421 (FIG. 21).

Guard plates 422 are integrally formed with tracks 412, one at either side of the platen and cooperating with the corresponding track 412, prevent the rollers 414 from running off the track. The tracks 412 are interrupted at 423 and a small spring pressed plunger 424 inserted in each track at this point. Also, as is indicated at 425 (FIG. 14) each track is bevelled at its rear end, thus making it possible, as will appear later, for the mold carrier and mold to have pressure transmitted directly to them rather than through the track and rollers.

For the purposes of transmitting pressure as indicated above, a plate 426 is interposed between the lower platen 401 and the undersurface of the mold carrier 413.

Fixed to the side of the track 412 immediately to the rear of the guard rail 422 is a mold separating fork 430. As seen particularly in FIGURES 2, 14 and 15, this fork extends upwardly and has inturned ends 431 which overlie the mold carrier 413 and thus assure that when the platen is lowered the lower mold will separate from the formed record and from the upper mold. The upper mold 432 is substantially identical with the lower mold and is carried in a substantially identical but reversed mold carrier 433. The carrier 433 is provided with a pair of rollers 434, one on each side, near the center thereof. Rollers 434 ride in corresponding closed tracks 435 fixed to the upper platen 400 by means of the brackets 436.

In the same manner as described in connection with the lower mold the upper mold 432 is provided with passages 440 for cooling and heating fluid and is likewise provided with a matrix or stamper 441 bearing the record grooving for the opposite side of the record which stamper is held in position between the coining ring 442 and the retaining ring 443.

Likewise in much the same manner as in the lower mold structure a fork member 444 is provided fixed to the upper platen 400 and lying adjacent the end of the upper track 435. This fork member has inturned projections 445 which underlie the surface of the mold carrier 433 and serve to separate the molds as the ram descends after completing the pressure molding of a record. The fork member 444 also serves to position the upper mold carrier so that when it is to be moved outwardly and into the open position the rollers 434 thereon are in alignment with the track 435.

At the center of the mold a threaded insert 427 is positioned into which insert a small circular die member 428 is threaded, this die cooperating with an upper similar member to form the spindle aperture in the record.

The upper mold is provided with an insert 437 at the center thereof in which a die 438 is positioned for reciprocation, this die serving as indicated hereinabove to cooperate with the lower die 428 to produce the spindle aperture in a record as it is formed.

As shown in FIGURES 14 and 16, the upper mold carrier 433 is provided with ears 446 at either side thereof. The lower mold carrier is provided at either side thereof with bushed bores 447 in which plungers 448 are reciprocably mounted, plungers 448 being slotted as shown at 450 and having a pin 451 extending therethrough to prevent rotation. Each plunger 450 terminates at its upper end in an ear 452 located adjacent the corresponding ear 446 of the upper mold carrier. A hinge pin 453 extends through apertures in the ears 446 and 452 thereby hinging the upper mold carrier to the lower mold carrier.

The upper mold carrier is provided with four bushed apertures 454, one adjacent each corner, see FIG. 16. The lower mold carrier 413 is provided at corresponding locations with guide pins 455, see FIGS. 1 and 16, over which the bushings 454 fit as the molds are pressed together. It will be noted that the bushings 454 have a taper at their lower ends and that the pins 455 are tapered at their upper ends to provide the proper guiding action.

Lower mold carrier 413 is provided with four additional apertures in which spring pressed plungers 456 are placed, these plungers being inserted through the mold carrier and formed with an outwardly extending lip 457 cooperating with a shoulder in the bore to thereby limit the outward movement. When the mold members are closed the upper mold carrier 433 rests upon the spring pressed plungers 456. The plungers 456 also serve to separate the molds after the molding operation is completed and in so doing cooperate with the forks 430 and 444.

Referring now to FIGURES 2 and 14, a bracket 458 is fixed to the rear edge of the platen 401 on the center line thereof. Fixed in this bracket is an air cylinder 469, the piston rod 461 of which extends forwardly and is connected by means of the yoke 462 (FIG. 1) formed on the lower mold carrier 413 to that carrier. When this air cylinder is operated to cause the piston to move rearwardly, mold carrier 413 moves to the rear and at the same time, due to the rollers 434 of the upper carrier following the grooved track 435, the upper mold half closes against the spring pressed plungers 456 and the two mold halves are moved rearwardly to be positioned in alignment with the platens 400 and 401. This position is indicated by the dotted line positions of the rollers 414 of the lower mold carrier and as stated hereinabove in this position the rollers are not supported by the track but the forward rollers are instead resting upon the spring pressed plungers 414 and the rear rollers are above the bevels 425. This arrangement assures that the pressure will be transmitted from the lower platen 401 through the plate 426 directly to the mold carrier and through the mold to the stamper.

It should be noted that both the upper and lower stampers or matrices are provided with shallow central depressed areas which accommodate the labels.

Mounted adjacent the forward edge of the lower mold carrier 413 (when that mold carrier is in its outward position) by means of the brackets 463 (integral with the track 412) are shock absorbers 464, see FIGURES 1, 14 and 47. These shock absorbers comprise pins 465 mounted in bushing 466 in upwardly extending portions 467 of brackets 463. Each pin 465 on its outer end bears against a rocker arm 468, the rocker arm being pivotally mounted by means of the pin 470 in outwardly extending ears 471 formed on the bracket 463. The other end of the rocker arm bears against a plunger 472 mounted in a bushed aperture in the bracket 463. The plunger 472 is urged outwardly by a spring 473 which is compressed between the plunger and a headed screw 474 threaded into the bracket 463 in alignment with the plunger bore.

Adjacent the inward end of each pin 465 the lower mold carrier 413 is provided with a blind bore having a bushing 475 therein. It will be seen therefore that as the mold carriers move outwardly under drive of the air cylinder 460, they are arrested in their fully outward position by means of the shock absorbing mechanism just described, this shock absorbing mechanism being provided because of the considerable inertia of the parts and the relatively high speed of movement from their rearward to their forward position.

In order to assure that the central spindle opening in the formed record be properly formed, the pins or dies 428 and 438 previously described are provided. The die 438 is in alignment with a vertically extending central aperture in the upper platen 400 in which the piston rod 476 of a bellows type actuator 477 mounted on the top of the platen 400 by means of the fitting 478, is reciprocable. As the mold press closes the bellows actuator 477 is energized to thus press the die 438 downwardly to assure that the spindle hole in the record be properly formed.

As mentioned hereinabove, when a record press of the type here utilized is manually operated, it is substantially immaterial whether the formed record adheres to the upper or the lower stamper. However, when the press is incorporated in an automatically operating machine it is essential that the record adhere to one of the two stampers in order that the mechanism for removing the record cooperate with the single mold half. In order to assure that the pressed record always remains on the lower stamper when the upper and lower molds separate, the retaining ring 421 of the lower mold is provided at spaced intervals with the tapered headed screws 480. These screws are of course beyond the periphery of the record and in the area into which the flash flows. Consequently the flash forms around the tapered heads of these screws and when the mold halves separate the record is held to the lower half. As will appear hereinafter, the taper screws or pins 480 also serve to form the flash in a manner which makes it possible to pick up the record from the mold and carry it to a trimming station.

Mounted on one of the mold carrier tracks in a position to be momentarily operated as the mold members mold into their outward position, is a microswitch 481 which is utilized in the manner to be described hereinafter to assure against damage in the event that due to maladjustment or otherwise two operations which should not occur simultaneously do not thus occur.

Fixed to the rear of the upper platen 400 is a second microswitch 482 which switch, as will be more fully described hereinafter, is utilized to close a circuit to, and start in operation a mold cycle timer, which admits heating fluid to the molds, causes operation of the mold ram, admits cooling fluid to the mold, and generally controls the complete operation of the molding press in the usual manner.

Additionally, there is mounted on the bracket 458 an air switch 483 which causes a bleeding of air from the pneumatic line which controls the operation of the hydraulic ram thereby preventing operation of that ram until the mold carriers, with their respective molds, are in position between the platens.

Fixed to the bracket 458 for movement therewith is a rod 484 having a cam 485 adjustably positioned thereon. This cam 485 cooperates with a microswitch 486 which, as will hereinafter appear, acts in conjunction with the timing mechanism to control the operation of the press ram.

*Record removing mechanism*

After the record has been pressed and the die carriers have been moved to their outward position and separated as shown in FIGURE 1, a record which has been formed is removed from the lower mold and transferred to a turntable for removal of the flash therefrom.

In this section of the specification the mechanism for effecting this transfer from the mold to the trimming turntable is described, reference being made to FIGURES 1, 2, 18a and 18b, 19, 20, 21, 22 and 23.

The record transfer mechanism is mounted upon the pedestal 101 and comprises an oscillatable arm 500 which moves from a position in which the record is taken from the mold to a position in which it is deposited on the trimming turntable.

Mounted on the top of the pedestal 101 is the mechanism for oscillating the record transfer arm 500. This mechanism includes a rotary air cylinder 501, the shaft 502 of which extends upwardly and is journalled in a bushing 503 in a housing 504. A second shaft 505 at its lower end is journalled in a bearing 506 mounted in the lower portion of the housing 504. Shaft 505 is journalled at its upper end in a second bearing 507 mounted in the upper portion of the housing 504. Shaft 505 is driven by shaft 502 through the medium of the spur gears 508 and 510.

Thus when the rotary air motor or Robotac 501 is energized the arm 500 rotates through a predetermined angle in a direction determined by the point of application of pressure to the Robotac vanes.

Mounted on the outer end of arm 500 is a record removing head generally designated 511. This head in its cycle of operation lowers clamping members into position above the newly formed or pressed record on the lower mold with clamping members resting upon the attached flash, clamps the flash between clamping fingers, rises to remove the record from the mold, carries the record to a position above the turntable and then lowers the record on the turntable and releases the clamps from the flash areas. Thereafter the clamps rise to be positioned for removal of a successive record from the mold.

Referring now particularly to FIGURE 18b, the record removing head includes a double piston air cylinder 512 which is fixed to the outer end of the remover arm in suitable manner as for example by means of the screws 513, FIG. 2. Mounted for reciprocation in the cylinder 512 is a piston 514. The space above piston 514 is connected by means of the passageway 515 and the passageway 516 in arm 500 to a fitting 517 and thence to an air valve which controls admission of pressure fluid to the upper side of the piston.

In a similar manner the lower side of the piston is connected by means of a fitting 518 in the cylinder wall to an air valve. It will be seen that when air is admitted to the lower side of the piston the piston rises and the disk 520 fixed thereto by means of screws 521 also rises, the clamping disk being prevented from rotating due to the pin 522 which is fixed in the hub portion 523 of the clamping disk and is slidably mounted in an ear 524 formed on the lower cylinder head.

Piston 514 is provided with a central bore 525 in which a piston 526 is positioned for reciprocating movement within the bore. Mounted on the lower end of the associated piston rod 527 by means of a ball and socket connection 528 is a rotatable disk 530 which is utilized to hold the record upon the trimming turntable in a manner later to be described. By means of passageways 531 and 532, the space above piston 526 is connected to a fitting 533 which, by means of a hose connection, is connected to a pressure source through a valve. In a similar manner the space beneath the piston 526 is connected by means of passageways 534 and 535 to a fitting 536 which likewise is connected through a valve to a pressure source.

During the operation of removing the completed record from the mold, pressure is constantly maintained on the lower side of piston 526 and the disk 530 is maintained in the elevated position as shown in FIGURE 18b, it being understood, however, that in that figure the arm 500 is not shown in the record removing position but is shown in an intermediate position as it approaches the trimming turntable.

Fixed to the lower surface of the clamping disk 520 is a peripheral ring 537, see FIGURES 18b, 20 and 22. Ring 537 is formed with an upwardly facing shoulder 538. A second ring 540 having an extension 541 which lies above the shoulder 538 is thereby held against the lower surface of the disk 520 and is rotatable with respect to the ring 537. At spaced points along the ring 537 downwardly extending clamping fingers 542 are fixed to that ring in any suitable manner as for example by means of the screws 543, FIGURE 23. At correspondingly spaced points on the movable ring 540 fingers 544 are fixed by means of screws 545. It will be noted by reference particularly to FIGURES 20 and 23 that the fingers 542 and 544 are offset radially in opposite directions from their mounting screws 543 so that the fingers proper lie on the same circumferential line and are movable toward and away from each other.

Pivotally mounted on screws 546 fixed in the upper surface of the clamping head 520 are the two levers 547. The outer end of each lever 547 is formed as a barrel shaped portion 548 which fits into a bushing 550 in an arm 551 fixed by means of a screw 552 to the outer clamping ring 540.

The inner end of each lever 547 is connected by means of a link 553 to the reciprocatory piston rod 554 of air cylinder 555. As shown in FIGURES 20 and 23, the piston rods 554 are extended and the clamping fingers 542 and 544 are in their clamping position. When air is applied to the other side of the pistons of the air cylinders 555 the piston rods move inwardly rotating the outer ring in a counterclockwise direction as seen in FIGURE 20 and causing the fingers 542 and 544 to separate.

The fingers 542 and 544 are, as is clearly shown in FIGURE 21, located radially outward from the center a distance equal to the distance at which the flash formed as the record is pressed and designated 556 is caused by the taper-headed screws 480 to be thickened providing areas radially inwardly of the screws which may be grasped by the clamping fingers. It will be understood that due to the cooling of the body of the record resulting from the flow of cooling fluid through the passages 417 and 440, the main body of the record is cooler than the flash. At the time when the clamping ring is lowered the flash is quite soft and plastic and thus when in the manner indicated hereinabove the clamping disk 520 is lowered and the rings then rotated by application of air pressure to the cylinders 555, the clamping fingers in moving together cause a portion of the record material in the flash area immediately radially inward of the holding screws 480 to be compressed between the fingers while remaining a part of and firmly attached to the flash.

When immediately thereafter the clamping head is raised the flash deforms and is compressed as the upward movement forces it along the taper of the screws 480 and the record is removed from the mold and is held only by the clamping fingers gripping the thickened areas of the flash as above described. As soon as the clamping head has been moved upwardly the rotary air cylinder is provided with pressure fluid to cause arm 500 to rotate in a clockwise direction as seen in FIGURE 1 carrying the record with it. This clockwise rotation is terminated when the center of the clamping disk is directly over the turntable as will shortly be described.

As has been indicated, when the clamping head arrives at position to deposit the record on the trimming turntable, the proper air valves are operated to cause pistons 514 and 526 to move downwardly. At first the disk 530 and clamping head 520 move together the record being positioned with the central spindle aperture therein over the turntable spindle. Immediately thereafter the clamping fingers release the record and at the same time piston 526 moves downwardly and piston 514 upwardly whereby pressure disk 530 holds the record against the trimming turnable, some freedom of movement of the disk 530 being permitted by virtue of the ball and socket joint 528.

Mounted on the shaft 505 are a pair of cams 562 and 563 which cooperate respectively with the operating levers 564 and 565 of microswitches 566 and 567.

These switches are arranged to have their contacts open momentarily upon movement of the corresponding cam in one direction but not to open as that cam moves in the other direction. The cam 562 is effective to open the contacts of microswitch 566 as the record removing arm approaches its outermost position while the cam 563 opens the contacts of microswitch 567 as the record remover arm approaches its inner most position, that is, the position which the record remover head is directly over the lower mold half. The microswitches 566 and 567 serve as safety switches to prevent conflicting operations as will appear further hereinafter.

Trimming turntable

As has been indicated just above, the record remover head 511 serves not only to remove the record from the mold, but also through the medium of the pressure plate or disk 530 to hold the record upon the turntable while it is trimmed. The trimming turntable is designated 600 and includes the central record spindle 601. Turntable 600 is mounted upon and driven by electric motor 602, FIG. 30, through the medium of a friction clutch 603.

At its periphery the turntable 600 is provided with an annular ring of friction material 606 which cooperates with a similar annular ring of friction material 557 fixed to the under surface of the disk 530. It will be seen that when the disk 530 is in its lowermost position as described above, the record is held between the rings of friction material 557 and 606 and the turntable, record and disk 530 rotate under drive of the motor 602 through the friction clutch 603. The position of disk 530 during this operation is indicated in dotted lines in FIGURE 18a.

As has been indicated above, when the record is deposited on the turntable 600 the flash 556 is still connected to the record and is in fact integral therewith lying just outside of the rim formed on the record and designated 558, FIGURE 21. The flash must of course be removed from the record in order that the record be complete and in salable condition.

A cutting mechanism is provided which trims the flash from the record just outwardly of the thickened rim portion 558. Since it is desirable that the flash trimmed from the record be reused in the making of other records, the trimming mechanism includes not only the trimming knives, but also breaker rollers which break the trimmed flash into small pieces. This breaking operation is desirable not only to provide small and readily handled pieces of flash for reuse, but it is also desirable in order to assure that the flash removed from the record does not remain in the form of a ring which would drop about the motor 602 and clutch mechanism 603 and be difficult to remove.

Trimming and breaking mechanism

As has been indicated hereinabove, means are provided for trimming the flash from the finished record and breaking that trimmed flash into small pieces so that it can be reused. These trimming and breaking means are shown in FIGURES 1, 2 and 24 through 29.

As seen in FIGURES 1 and 25, the trimming and flash breaking mechanism is mounted on a bracket 700 fixed to the pedestal 101. More specifically the housing 701 is part of the bracket 700, this housing supporting the elements of the mechanism about to be described.

Mounted on the housing 701 is a rotary air cylinder 702, the shaft 703 of which is keyed to a shaft 704 journalled in bearings 705 in the housing portion 701.

Formed integrally with the hollow shaft 704 is a bedplate 707 on which a support 708 for the trimming and breaking rollers is adjustably mounted. In order to provide for this adjustment a pad 710 is fixed to the upper surface of the bedplate 707 by means of the dowel pins 711 and screws 712. Setscrews 713 extend through tapped openings in the base of the support 708 and bear against the edges of the pad 710 thus making it possible to adjust the support member with respect to the bedplate 707.

Mounted on a horizontally extending portion 714 of the support member 708 is an electric motor 715, the shaft 716 of which extends into a cavity 717 formed in the support members 708 and being journalled in a bushing 718 fixed in a coverplate 720 for the cavity 717. Fixed to the shaft 716 within the cavity by means of its hub 719 is a gear 721.

Mounted in bushings 722 provided in apertures in vertically extending portions 723 and 724 of the support 708 are four shafts 725, 726, 727 and 728. Mounted on shaft 725 is a gear 730 which engages the gear 721. In like manner mounted on shaft 727 is a gear 731 which also engages the gear 721. Also mounted on shaft 725 is gear 732 which engages a gear 733 on shaft 726. In like manner there is mounted on shaft 727 a gear 734 which engages gear 735 on shaft 728, see FIGURES 25 through 27.

Fixed on the shaft 727 for rotation therewith is a cylindrical hub 736 on the face of which a rotary knife 737 is fastened by any suitable means such as the screws 738. Mounted on a reduced portion of shaft 728 is a second cylindrical hub 740 which is spring pressed outwardly by means of a compression spring 741 extending into the cavity 742 in the hub and bearing against a collar 743 fixed to shaft 728. Fixed to the outer face of hub 740 is a rotary knife 744 which lies behind the knife 738, that is, to the left as seen in FIGURE 27, the two knives thus coacting to form a pair of cutters which cut the flash from the record as it is rotated by the turntable 600. It will be understood that the knives rotate in such a direction as to cause rotation of the turntable 600 independently of the drive thereof. However, the slip clutch is provided as hereinabove described, in order to assure that an uncut portion of the flash will always be urged between the knives.

The flash, as it is trimmed from the record by knives 737 and 744, passes between rollers 745 and 746 (FIGURES 24 and 25) respectively mounted on shafts 725 and 726. The upper of the two rollers 745 has pointed ribs 747 thereon extending axially while the lower roller has spaced teeth thereon designated 748. The upper roller is mounted directly upon the corresponding shaft 725 whereas the lower roller 746 has rings in the nature of O-rings between the roller proper and the shaft, as shown particularly in FIGURE 29, the O-rings being designated 750. These O-rings serve to exert a pressure upon the lower roller keeping the surface thereof in position so that the ribs of the upper roller bear against it, and likewise so that the teeth of the lower roller bear against the surface of the flash. By means of these teeth the flash discharged from the cutting knives is fed to the breaker ribs and is broken by the ribs into small pieces which are then discharged into a chute 751, FIGURE 24, from whence they are discharged into a container to be returned to the feed hopper of the extruder.

In a manner similar to that which is utilized in connection with the other rotary air motors described, air motor 702 has a cam 760 fixed to its shaft 703 by any suitable means such as the setscrew 761 (FIGURE 28). The cam 760 is mounted within the housing portion 762 in which there are also mounted the limiting screws 763 and 764, these limiting screws being provided with lock nuts 765 and 766 respectively. Thus by adjusting the screws 763 and 764 the limits of oscillation of the support member 708 can be determined. Furthermore, by adjusting the screws 713 the entire support member 708 may be positioned relative to the bedplate 707 so that the cutting knives and breaker rollers are positioned to completely remove the flash from the record leaving a finished outer edge.

*Record discharge and stacking mechanism*

As has been described above, the record trimming operation is performed while the record is held on the turntable 600 by means of the pressure disk 530 of the record removing mechanism. When the record has had the flash removed therefrom in the manner just above described, the air motor 702 is energized to rotate the cutting knives and breaker rolls away from the turntable and immediately thereafter air is admitted to the chamber 525 of the record removing head 512 to cause piston 526 to move upwardly carrying with it the pressure disk 530. With the parts in these positions the record may be removed from the turntable as will now be described with reference particularly to FIGS. 1, 2, 30 and 31.

Fixed to the pedestal 101 is a bracket 800. Fixed to the bracket 800 at its outer end is a generally rectangular container 801 having a base 802, upstanding walls 803, 804 and 805 and a plurality of bosses 806, 807 and 808 formed thereon.

Container 801 is preferably of cast metal having relatively thick walls and the uppermost portion of each of the side walls 804 and 805 is formed with a recess at the upper edge forming tracks designated 810 and 811 respectively. These tracks are spaced apart so that they underlie the edges of a record such as that indicated at 812. However, near the right hand end of the container the tracks 810 and 811 are cut away as shown at 813 and 814 respectively so that when a record arrives at this position, as will later be described, it falls by gravity onto the bottom of the container or onto a record already deposited in the container.

Hinged to the bosses 806 and 807 by means of a hinge pin 815 passing through apertures in these bosses is a record fork 816. As clearly seen in FIGURE 31, the record fork is formed with track portions 817 and 818 which are in alignment with the tracks 810 and 811, but are at an angle to those tracks when the fork 816 is in the position shown in full lines in FIGURE 30.

Record fork 816 is formed with a downwardly extending portion 820 at each side thereof, the portion at the forward side, as seen in FIGURES 30 and 31, being provided with a boss 821 on either side thereof.

A forked bracket 822 is fixed to the surface of the boss 808 by any suitable means such as screws 824. An air cylinder 825 provided with a downwardly extending forked member 826 is pivotally mounted on the bracket 822, the pivotal mounting being effected by inserting a pin 827 through bosses at the outer ends of the arms of brackets 822 and through apertures in the arms of member 826.

Fixed to the upper end of the piston rod 828 of the air cylinder 825 is a forked member 830 which extends over the bosses 821 being pivotally fixed to the depending skirt portion of the record fork by means of a pin 831 which extends through apertures in the fork and in the bosses 821.

A spring 832 is stretched between a point 833 on the depending skirt 820 and a screw 834 fixed in the member 826.

When a record on the turntable 600 has been trimmed, the pressure plate moved upwardly and the record transfer arm moved out of position above the turntable 600, the air cylinder 825 is pressurized causing the record fork 816 to pivot about the pivot pin 815. The fork then takes the position indicated in dotted lines in FIGURE 30 carrying the record with it. It is to be noted that the spindle 601 is formed with tapered portions thus permitting the tipping of the record without its binding on the spindle. It is also to be noted that the level of the tracks 817 and 818 in the fork is slightly higher than that of the corresponding tracks 810 and 811 in the upper side wall portions of the container 801, thus assuring that the record will not catch on the initial or left hand edges of the tracks 810 and 811.

In order to guide the record into a stacked arrangement in the container 803 four upstanding posts 835, 836, 837 and 838 are provided, these posts being circular in cross section and being fastened to the inner side walls by means of the grooved washers 840 and 841.

It will be noted that the posts 837 and 838 extend to a position flush with the upper edge of the side walls whereas the posts 835 and 836 terminate just beneath the level of the respective tracks 810 and 811. Thus a record is stopped by the posts 837 and 838 as it slides down the tracks, and then, due to gravity, falls through the cutouts 813 and 814 and guided by the four posts is positioned on the bottom or on a record previously positioned.

At a suitable time during the cycle of machine operation, the lower side of the piston of air cylinder 825 is connected to atmosphere and the upper side to the pressure source. The spring 832 then aids in returning the record fork to its horizontal position as shown in full lines in FIGURE 30. It is of course understood that the accumulated records in the container 801 are removed at suitable intervals, these records being then in condition for packaging. In order to facilitate removal of a stack of records, the base 802 of the container 801 is provided with a cutout at 842.

*Timing and control circuits and mechanism*

As is obvious from the above, the various mechanisms heretofore described must be operated in a timed sequence and in such manner as to assure that in the event of failure of operation of any part the machine stops in order to prevent damage. Portions of the timing and control mechanism have already been described, but in large measure without reference to their relationship to other elements of the machine and the cycle of operation.

In order to more readily describe the timing and control mechanisms a description is given of the operation of the machine when initially started and through a cycle of operations sufficient to produce two records. This description will refer to many of the figures, but particularly to FIGURES 32 and 33 which together constitute a schematic wiring diagram.

The timing and control circuits include a vacuum tube 900 together with a rectifier 901 forming the source of direct current for operation of the vacuum tube (FIGURE 32). The tube 900 is arranged in a circuit including the capacitor $C_1$ and voltage dividing resistors $R_1R_2$ together with the capacitor $C_2$ and resistor pairs $R_4R_9$, $R_5R_8$ and $R_6R_7$. The circuit arrangement just mentioned is a common form of pulsing circuit and operates in such manner that upon application of voltage in the grid cathode circuit the condenser $C_1$ charges until the grid reaches a potential at which the tube will fire. If at this time the plate is connected to a source of plate voltage the tube will actually fire and conduction will continue until condenser $C_2$ is sufficiently charged so that the tube cuts off. After this occurs the cycle will be repeated thereby producing pulses the duration of which are varied depending upon whether $C_2$ is in parallel with one or the other of the resistor pairs heretofore mentioned. As arranged in this instance, the longest pulse is produced when resistors $R_4$ and $R_9$ are connected in parallel with condenser $C_2$ and the shortest when the resistor pair $R_6R_7$ is so connected.

Output pulses from the vacuum tube 900 energize the stepping magnet 902 of a rotary switch which comprises the four contact banks 903, 904, 905 and 906. The elements thus far described, together with additional elements which will appear as the description of the cycling of the machine is given, operate to cause that cycling and to assure that the stepping switch will stop if there be any possible conflict in movement of the various parts which might result in damage to the machine.

In addition to the rectifier 901 which supplies the required voltages to the vacuum tube 900, a second rectifier 907 is utilized to supply direct current at proper voltages to relays, solenoids, pilot lamps, etc.

When the machine has been shut down it is first necessary of course to close the switches which supply alternating current power to the various circuits. It is also desirable to cause the mold timer which is a common form of timing mechanism for molding presses (such as that manufactured by Seeley Instrument Company under catalog #DT4) to operate through a few cycles in order to bring the press to molding temperature. Additionally, of course, it is necessary to heat the record compound in the extrusion chamber in order that the compound be at proper temperature for deposit in the press.

In addition to the operations described above, the wipers 908 through 911 of the stepping switch are manually set to their zero position, these wipers being of course mechanically interconnected in the usual manner. Additionally, labels which may be on the upper and lower mold parts are removed and a switch 912, FIGURE 32, is opened to assure that the mold halves will not enter the press without having first received record compound.

With the stepping switch wipers in the zero position a circuit is completed from the 12 volt winding of transformer 913 over conductor 914 and through wiper 911 and pilot light 915 to ground indicating that the stepping switch is in zero position and the various circuits energized and ready for operation.

Additionally, a circuit is completed from the negative terminal of the bridge rectifier 901 over conductor 916 and through wiper 910 and conductor 917 to resistor $R_7$ to provide for a short duration pulse through the stepping magnet 902. However, no pulse can occur at this time due to the fact that a circuit is also completed from the 12 volt winding of transformer 913 through conductors 914, 918, double pole switch 919, conductors 920, 921, wiper 909, zero contact of the bank 904, conductor 922, switch 923, conductor 924 (FIG. 33), mold-out switch 481 (FIG. 14), and winding of relay 925 (FIG. 32) to ground. Relay 925 is therefore energized at this time and due to its energization no plate battery is applied through the winding of relay 926 to the tube 900. It will be apparent that when relay 925 is deenergized plate battery is supplied to tube 900 over a circuit which extends from the positive side of the bridge rectifier 901 (FIG. 32) over conductor 927, through switch 919, over conductor 928, upper contact and armature of relay 925, conductor 930, winding of relay 926 to the plate of tube 900. Since as described no voltage is applied to the plate of tube 900, the tube does not fire and the stepping magnet is not energized.

In order to start the operation therefore switch 923 is operated to open the circuit heretofore described. Switch 923 is of a dashpot type and remains open for a predetermined interval sufficient for the tube 900 to produce one complete pulse of the selected duration. This causes deenergization of relay 925 and application of plate voltage to tube 900. Tube 900 being rendered conductive, relay winding 926 is energized closing its contacts. As a result positive direct current voltage from bridge rectifier 907 is applied over conductor 931, through the closed contacts, and thence over conductor 932 to the stepping magnet 902. This causes the pawl operated by the stepping magnet to ratchet over the teeth of the ratchet wheel. The actual stepping movement is, however, delayed until the tube 900 cuts off at which time the usual spring returns the stepping magnet armature to normal position and causes rotation of the wiper shaft thus advancing the wipers to the #1 position.

The switch wipers 908 through 911 now all rest on their No. 1 contacts resulting in the completion of various circuits.

One of these circuits leads from the 12 volt source over conductors 920 and 933 to wiper 908 of bank 903 and thence over conductor 934 and the winding of relay 935 to ground. Relay 935 operates completing a circuit from the 12 volt source over conductor 936, contacts of relay 935, conductor 937 to solenoid 560 (FIGURE 33). The solenoid 560 is one of a pair of solenoids 560 and 561 which operate an air valve controlling flow of air to the rotary air motor 501 (FIGURE 18a). Energization of the solenoid 560 causes air to be admitted through this air valve, not shown, to the proper side of the rotary motor 501 to cause the record removing arm to move into position above and in alignment with the axis of the lower mold half 416.

A branch of the circuit just described leads from conductor 937 by way of conductor 938 to solenoid 767, which is one of a pair of solenoids which controls the in and out movement of the unit embodying the trimming knives 737 and 744, the other solenoid being designated 768 and controlling the inward movement of these knives. More specifically, solenoids 767 and 768 control an air valve which in turn governs the flow of air to the rotary air motor 702 rotating its shaft 704 (FIGURE 25) as indicated to carry the unit into and out of record trimming position.

A second circuit is completed from the wiper 904 over conductor 940 to switches 566 and 567 (FIGURES 18b and 33) in series and thence to conductor 541 and over conductors 941 and 924 and through the winding of relay 925 to ground. As a result of completion of this circuit relay 925 is energized and the plate voltage will be removed from vacuum tube 900 when the contacts of slow acting relay 925 close.

A third circuit is completed at wiper 910 of switch bank 905 to connect resistances $R_6$ and $R_7$ into the vacuum tube cathode circuit to provide for a short duration pulse. The pulse, however, is not immediately initiated due to the removal of plate voltages as stated hereinabove.

As the record remover arm 500 reaches its innermost position it causes opening of the contacts of microswitch 567 thereby deenergizing relay 925. Deenergization of this relay applies plate voltage to tube 900 which then produces a relatively short pulse which causes energization and deenergization of the stepping magnet 902 thereby stepping the wipers to the #2 position. It is to be noted that switch 567 and all similar safety switches and actuators are arranged so that it remains open for a period of time sufficient to permit tube 900 to produce a complete pulse.

A circuit is now completed from wiper 908 over contact #2 of switch bank 903 to conductor 942 and thence to solenoid 843 (FIGURE 33) which is one of a pair of solenoids which control admission of air to the air cylinder 825 (FIG. 30), the other one of the pair being designated 844. As a result air is admitted beneath the piston of air cylinder 825 and the record fork 816 rises to discharge a record. Since it has been assumed that the machine was starting up and that it was cleared of records at the end of its prior use, there will of course be no record on the fork to be discharged.

At the same time that the circuit just above described was completed a circuit was also completed from wiper 910 to the resistor pair $R_6R_7$ to produce a short output pulse from tube 900. As a result of this the stepping magnet 902 is energized and then deenergized causing the wipers to step to their #3 contacts it being understood that once the solenoid 843 has operated, the associated air valve admits air beneath the piston of air cylinder 825 until that piston has reached its uppermost position and, in fact, until the companion solenoid 844 has subsequently been energized.

A circuit is now completed from wiper arm 908 over contacts #3 and conductor 943 to a solenoid 568 and thence to ground. Solenoid 568 is one of a pair, comprising this solenoid and solenoid 570, which control the admission of air to the chambers above and below piston 514 (FIGURE 18b) respectively. Thus energization of solenoid 568 results in lowering the record head into record clamping position (ineffectively of course since there is no record on the lower mold half to be removed in this cycle).

A second circuit is completed through wiper 910 and contact #3 of bank 905 to again produce a short output pulse from the vacuum tube 900.

No circuit is completed through contact #3 of switch bank 904 and relay 925 therefore remains deenergized and plate voltage is connected to tube 900. Therefore the tube produces a pulse of short duration at the termination of which the wipers step to the #4 positions.

The use of the double acting solenoid controlled valve comprising the solenoids 568 and 570 assures that air will be admitted to the chamber above the piston 514 and will hold the clamping head in its lower position.

A circuit is now completed from contact #4 of switch bank 903 through conductor 944 to one of the pair of solenoids 571 and 572 (FIGURE 33), namely, to solenoid 572. This solenoid then causes opening of an air valve and directs air pressure to the air cylinders 555 on the side of their pistons to cause clamping movement of the ring 540 (FIGURE 20).

No circuit is completed through the #4 contact of switch bank 904 but a circuit is completed through the #4 contact of bank 905 to resistor pair $R_5R_8$ to assure a pulse of intermediate length in the output of the tube 900, thus assuring that the clamping ring will reach its full clamping position before the wipers are stepped to the #5 position.

A circuit is now completed from wiper 908 to the #5 contact of switch bank 903 and thence over conductor 945 to solenoid 570 and to ground causing operation of solenoid 570 and admission of pressure to the lower side of piston 514 to raise the record remover head.

No circuit is completed through the #5 contact of switch bank 904 but a circuit is completed through the #5 contact of switch bank 905 to cause a short duration pulse thereby causing the wipers of the various switch banks to step to the #6 positions.

A circuit is now completed from wiper 908 over contact #6 of the bank 903 and conductor 946 to winding of relay 947. The operation of relay 947 connects the conductor 920 to conductor 948 and hence energizes solenoid 844. At the same time over the branch conductor 950 solenoid 561 is caused to energize. As a result of operation of solenoid 844 the record discharge fork 816 is restored to its lower position and as a result of energization of solenoid 561 the record remover arm 500 starts to move toward its outermost position.

Also, a circuit is completed through contact #6 of switch bank 904 and over conductors 951 and 940 to record remover arm switches 566 and 567 in series. Due to the fact that switch 567 (which in common with all the momentary contact switches is operated by movement in one direction only) is not operated to open its contacts as the arm moves outwardly, this circuit is completed through conductor 924 to relay 925. This results, in a manner already described, in removing plate voltage from the plate 900 and thus prevents stepping of the stepping switch until switch 566 is opened for a predetermined short interval as the arm 500 approaches its outward position at which time relay 925 deenergizes and the tube 900 produces a short pulse at the termination of which the wipers step to contacts #7.

A circuit is now completed from wiper 908 over contact #7 and conductor 952 to solenoid 265 (FIGURE 33) and thence to ground. Solenoid 265 is one of a pair, the other solenoid of which is designated 266, these solenoids controlling an air valve which admits air to the rotary air motor 208 (FIGURE 7) in a manner to cause the record label arms 201 and 202 to move to their inner positions, i.e., the positions in alignment with upper and lower mold parts 416 and 432 respectively.

A circuit is also completed from wiper 909 through contact #7 of switch bank 904 to conductor 953 and to label arm microswitches 258 and 260 (FIGURES 9 and 33) in series and thence over conductors 941 and 924 to winding of relay 925. In a manner previously described, energization of relay 925 prevents application of plate voltage to tube 900 and thereby delays operation of the stepping magnet.

As the label arms approach their inner positions switch 258 is operated to open its contacts for a predetermined short interval thereby deenergizing relay 925 causing application of plate voltage to tube 900 and thereby stepping the wipers of the switch banks to their #8 position after a delay resulting from the connection of resistor pair $R_4R_9$ in the cathode circuit of tube 900, this relay being the longest delay available.

When wiper 908 contacts the #8 contacts, a circuit is completed over conductor 954 to a solenoid 267 which, with solenoid 268, constitutes operating means for an air valve which controls admission to the upper and lower sides of the piston of air cylinder 235 (FIGURE 6). As a result of energization of solenoid 265 air is admitted through hose 236 above the piston of the air cylinder, and the label heads 243 are driven toward the respective mold parts. This would normally cause labels to be placed on the upper and lower stamper plates but will not in this instance since no labels were removed from the magazine due to the fact that this is the initial cycle.

At the same time that wiper 908 moves to its contact #8 wiper 910 also moves to its contact #8 thus causing a short pulse to be produced by tube 900 and the wipers to move to their respective #9 contacts.

A circuit is now completed from wiper 908 through conductor 955 to relay 956. This relay then energizes and completes a circuit from conductor 920 over conductor 957 to solenoid 268 the energization of which moves the air valve controlling position of the label head to its other extreme and thereby, through fitting 237, pressurizes the lower sides of the pistons of air cylinders 235 and causes the label heads to move away from the molds.

Additionally, wiper 911 of switch bank 906 completes, through its contact #9, a circuit extending through conductor 958 to a solenoid 270 (FIGURE 33) which solenoid is effective, in a manner not shown, to cut off the vacuum from the vacuum cups 252, i.e., to cut off vacuum in the line 257. Thus the label heads 243 would release labels held thereon, depositing them on the corresponding mold parts. (Since no labels are present at this time there is, of course, no placing thereof on the molds or stampers.)

Solenoid 270 is a spring returned solenoid so that as soon as wiper 911 moves off contact #9 the solenoid is returned to its normal position and vacuum is reapplied to the vacuum cups 252.

It is to be noted that the pilot light 960 is lighted while wiper 911 is on contact #9 thus indicating the cutoff of vacuum to the line 257.

As described hereinabove, the positioning of wiper 910 on its contact #9 causes the pulse output of the tube 900 to be of short duration after which the stepping magnet 902 is energized to position the wipers on respective contacts #10.

A circuit is now completed from wiper 908 over contact #10 of switch bank 903 and conductor 961 to solenoid 266 which energizes. The corresponding valve then operates to admit air to the proper side of the rotary air motor 203 to cause movement of the label arms 201 and 202 to their outermost positions.

Also a circuit is completed from wiper 909 through contact #10 of switch bank 904, conductor 953 and thence over the label arm switches 258 and 260 in series (FIGS. 9 and 33) to conductor 924 and to the winding of relay 925. Relay 925 is held energized until the label arms approach their outermost position at which time switch 260 opens for a predetermined interval, thereby supplying plate voltage to the vacuum tube 900, to produce a pulse from that vacuum tube and consequent stepping of the switch wipers.

Also switch wiper 910 connects the resistor pair $R_6$ $R_7$ in the cathode of the vacuum tube to provide a pulse of short duration and of course this pulse causes the wipers to be moved to their #11 contacts.

A circuit is now completed from wiper 908 over contact #11 of bank 903 to conductor 962 and through winding of relay 963 to ground. Relay 963 completes a circuit from conductor 920 over conductor 964 to a solenoid 347 which solenoid is one of a pair controlling the operation of an air valve which in turn controls the rotary air motor 501 (FIGURE 18a) and the rotary movement into and out of position above the mold of the material transporting arm 302. The second solenoid of the pair is designated 348.

Operation of relay 963 also completes circuits over conductor 964 and branch conductors 959 and 969 to solenoids 571 and 573. Solenoid 571 has already been considered. It is effective to cause the record clamp to open. Solenoids 573 and 574 are a pair which operate an air valve to control admission of air above and below the piston 526 of the record removing head. Thus operation of solenoid 573 causes the record pressure disk 530 to move downwardly in position to clamp the record on the turntable 600 for rotation therewith.

At the same time wiper 909 completes a circuit from conductor 921 through contact #11 of switch bank 904 over conductor 965 to switches 340 and 338 (FIGURES 10 and 33) in series and thence over conductor 924 to relay 925. In a manner described previously the relay 925 is thus held energized during the movement of the material transporting arm 302 to its innermost position preventing stepping of the wipers until timed opening of contacts 338 causes deenergization of relay 925. It will be understood that the movement of the compound arm into position over the lower mold part is ineffective at this time since no record material or compound has been extruded into the cup of the arm 302.

As before, upon deenergization of relay 925 tube 900 produces a pulse, this time of the longest duration, and the wipers move to the next or #12 contact. The long duration pulse is utilized in order to be certain that the compound arm is in correct position above the center of the lower mold part before the stepping switch moves to the #12 contact, the effect of which is immaterial, as will be described hereafter, to lower the arm into position immediately above the mold part.

Upon stepping to the #12 contacts wiper 908 completes a circuit through conductor 966, through the winding of relay 967 and thence to ground. Relay 967 then operates completing a circuit from conductor 920 over conductor 968 to solenoid 350 which solenoid is one of a pair the other of which is 351. This pair of solenoids controls an air valve in such manner that operation of solenoid 350 admits air to the upper side of the air cylinder 311 (FIGURE 10), to thereby lower the material transporting arm 302.

A branch conductor 970 leads from conductor 968 to solenoid 768 already described, which operates an air valve to admit air to the proper side of rotary motor 305 to cause the trimming and flash breaking unit to rotate counterclockwise to position to remove the flash from a record on turntable 600. However, during the cycle now being described no record has been deposited on the turntable and of course there is no effective trimming operation performed.

No circuit is completed through contact #12 of bank 904 and consequently relay 925 remains energized and after delay due to the pulsing of tube 900 stepping magnet 902 operates, thus positioning the wipers on their #13 contacts.

Wiper 908 completes a circuit through #13 contact of bank 903 and over conductor 971 to a solenoid 352 which, with its companion solenoid 353 control admission of air under pressure to opposite sides of the piston of air cylinder 313 (FIGURE 13). The energization of solenoid 352 causes the piston of air cylinder 313 to operate in a direction to cause the arcuate members 327 bearing the lugs 328 to open followed by opening of the cylindrical side members 314. This would, of course, as has been described in detail, cause the measured quantity of record material or compound to be placed on the lower mold half and specifically on the central portion of the stamper above the label if it were not for the fact that, during this particular cycle, no label has been deposited nor has any record compound been placed in the cup.

No circuit is completed through contact #13 of switch bank 904 and therefore the only delay in stepping of the wipers of the switch is that occasioned by the length of the pulse output of tube 900. Upon termination of this short pulse the wipers step to their #14 contacts.

A circuit is now completed over wiper 908, contact #14 of bank 903 and conductor 972 to the solenoid 351 which energizes and causes the associated air valve to admit air under pressure to the lower side of the piston of air cylinder 311 to raise the material transporting arm 302 to its upper position.

No circuit is completed through contact #14 of bank 904 and therefore the stepping switch moves to the #15 contacts after the short delay occasioned by the length of the output pulse from tube 900.

At this time a circuit is completed from wiper 908 over #15 contacts of bank 903 and conductor 973 to the winding of relay 974. Relay 974 operates completing a circuit from conductor 920 through conductor 975 to the solenoid 352 which then causes pressure to be applied to the left hand side of the piston of the air cylinder 313 (FIGS. 10 and 11), thereby causing the members 327 and 314 to close.

At the same time over a branch of conductor 976 solenoid 348 is energized and causes the compound or material transporting arm 302 to move to its outer position, that is, the position in alignment with the extrusion nozzle and resting upon the table 330 (FIG. 13).

Also at this time, through wiper 909 of switch bank 904 a circuit is completed over conductor 965 to microswitches 340 and 348 (FIGS. 10a and 33) in series and thence to relay 925. As before, this circuit energizes relay 925 and retains it energized until the switch 340 is opened for a predetermined short interval as the compound arm approaches its outermost position, thus delaying the stepping of the switch by delaying the pulse output from tube 900. As before, upon deenergization of relay 925 and cutoff of tube 900 stepping magnet 902 causes the wipers of the switch banks to advance to their #16 contacts.

A circuit is now completed through wiper 908 and contact #16 of bank 903 to conductor 977 and to the switch 912. This switch is now open as stated hereinabove in order to prevent the mold halves from closing and entering the press.

Since the mold carriers have not entered the press due to the fact that switch 912 is open, there will be no operation of microswitch 482 (FIGS. 2 and 14) and consequently the molding cycle timer will not be energized to go through its cycle. Since the molding cycle timer also is arranged to control the operation of the compound material extruder, it will be clear that no record compound will be deposited in the material transport arm cup. Therefore, in order to assure that material will be present in the transport arm cup during the following cycle, a switch which is in parallel with the extrusion control of the molding cycle timer is now energized causing a measured quantity of record material to be deposited in the cup.

Since no delay circuit is completed at contact 16 of bank 904 no delay occurs other than the short delay resulting from the tube timing circuit and the stepping switch after this short delay steps into position with the wipers on #17 contacts.

A circuit is now completed from wiper 908 through contact #17 to conductor 978 and thence to conductor 954 and solenoid 267. As previously described operation of solenoid 267 admits air to the cylinders 235 of the two label heads to move these heads against the labels in the magazines 105.

Again the circuit to relay 925 is not broken and therefore the stepping switch steps to its #18 contacts under control of the tube 900 only.

A circuit is now completed from wiper 908 through contact #19 of the bank 903 and over conductor 980 to solenoid 153. This solenoid, together with its companion solenoid 154, control an air valve which admits air to one side or the other of each of the label magazine air cylinders 135. Operation of the valve in the direction caused by energization of solenoid 153 causes admission of air through fitting 146 to the right hand or upper end of the piston 131 thereby moving the pressure block 126 of each of the label magazines away from the stack of labels in that magazine. Thus the outer label is free to assume a slightly convex form so that it may escape from the fingers 122 of plate 113 as well as over the head 125 of spindle 124 when the label arm is moved away from the magazine.

Again no delay safety circuit is provided at this contact and therefore the stepping switch steps to the #19 position after a delay resulting solely from the pulse length produced by tube 900.

A circuit is now completed from wiper 908 over conductor 981 to conductor 957 and through solenoid 268 to energize that solenoid. The air valve controlling movements of the label heads is now positioned to cause these heads to move away from their respective magazines thus removing the outermost label of each stack from the stack, the label being of course retained on the vacuum cups of the label head.

Again no delay circuit is involved and, after a short delay, the stepping switch is energized moving the wipers to the #20 contacts.

A circuit is now completed from wiper 908 over contact #20 of bank 903 and thence over conductor 982 to solenoid 154. Energization of solenoid 154 reverses the label magazine air valve and thus causes the pressure blocks 126 to move to place the stacks of labels under compression awaiting subsequent label pickup.

No circuits are connected to contacts 21, 22, 23, or 24 of banks 903 and 904. Consequently under control of the timing circuit the wipers step idly through these contact positions and return to the zero position.

As before, the relay 925 is energized over the circuit extending from #0 contact of bank 904 preventing further operation of the stepping switch. At this time manual switch 912 is closed in order to permit operation of the mold carriers into and out of the press during the ensuing operation and after the switch is closed the start switch 923 is again energized.

The operations previously described in detail now occur in the same sequence, the operations of the record remover arm and of the record discharge fork being again ineffective since no record has been pressed.

However, when the label arms now move toward the stampers after movement into their position in alignment with the stampers they deposit labels thereon with the central label opening on the die pins 428 and 438. Also, after the label arms have returned to their outermost position the compound transport arm moves into position and deposits the material now present in the cup on the lower mold part and overlying the just deposited label.

When the compound or material transport arm has returned to its outermost position, i.e., into position to receive another charge of the record material or compound, the stepping switch is stepped into the next position, namely, into position in which the wipers lie on the #16 contacts.

This completes a circuit over conductor 977 and through the switch 912 (FIG. 33) to conductor 983 and to solenoid 487. This solenoid is one of a pair, the companion solenoid being designated 488. These two solenoids control the operation of an air valve which in turn controls the admission of pressure fluid to cylinder 460 (FIG. 14). Operation of solenoid 487 causes admission of pressure fluid to cylinder 460 to cause movement of the piston rod 461 to the right thus carrying the mold carriers, molds and stampers into position between the press platens. As the mold carriers move into position the contacts of microswitch 482 close and a circuit is completed to the mold cycle timer, not shown.

As the stepping switch wipers step over contacts 17 through 24 the label heads pick up new labels and the stepping switch wipers return to the zero position.

During the period when this is happening the mold cycle timer causes steam to first be admitted to the passages in the molds to heat the molds to proper record pressing temperature; to energize bellows actuator 477 (FIGS. 14 and 15) to thereby press the pins or dies 428 and 438 together to assure a proper spindle opening in the record; to thereafter cause the ram to be moved upwardly (the bleed valve 483 having been operated to close off bleed of air from the valve controlling the ram to make ram energization possible); to circulate cold water through the mold passages to cool the record and to thereafter remove pressure from the ram and permit it to return to its lower position.

As the ram returns to its lower position the cam 485 (FIG. 14) strikes the operating lever of switch 486 (FIGS. 14 and 33) causing momentary closure of that switch and energizing solenoid 488 over a circuit extending from the power source through conductor 984, ram switch 486 and solenoid 488 to ground. Energization of solenoid 488 results in applying pressure fluid to the right hand side of cylinder 460 and therefore serves to return the mold carriers to their outermost position and, due to the curved track, to separate them and cause the upper mold part to move into vertical position as shown in FIGURE 14.

At the same time that solenoid 488 operates, a solenoid 574 which is in a circuit branched from the ram switch 486 by means of conductor 985 also operates and thus causes the pressure plate or disk 530 (FIG. 18b) to rise.

Also, the delay circuit is conditioned to provide a short pulse but it is prevented from supplying that pulse until after the mold carriers have reached their open position since relay 925 is not deenergized until the switch 481 (FIG. 14) is momentarily opened for a predetermined short interval as the lower mold carrier approaches its extreme outer position.

As the mold moves into the outer position it of course carries with it a completely pressed record having flash in the form of "scallops" attached thereto at the periphery and having proper labels carried on the central portion of the upper and lower faces.

The label arms now pick up labels from the label magazines in a manner previously described and immediately thereafter the record remover arm 500 rotates counterclockwise to position above the record on the lower mold half ready to pick up the first record. At the same time the trimming unit rotates in a counterclockwise direction to position to trim a record on the turntable 600 but since there is no record on that table this action is ineffective. Immediately after these operations the record discharge fork 816 moves upwardly to discharge a record from the turntable 600. Again this is ineffective since there is no record on that turntable.

Following this the record remover arm or, more accurately, the clamping head moves downwardly to pick up the first record, this being immediately followed by closing of the clamps which then grip portions of the flash of this first record. Immediately after this the remover head moves upwardly stripping the record flash from the tapered pins and removing the record from the lower mold half. This is followed by outward movement of the record remover arm 500 and at the same time the record discharge fork 816 moves downwardly in order to be in the position to permit deposit of the record on the turntable 600 and in position to subsequently discharge this first record into the container.

Next the label arms 201 and 202 move inwardly with labels carried thereon to position to deposit the labels on the mold halves, these labels being those for a second record. Following the inward movement of the arms, the label arm heads move against the mold parts and deposit the labels upon these mold parts after which the label arms 201 and 202 move outwardly to their extreme position in alignment with the respective magazines to pick up labels for the third record.

Now the compound arm moves inwardly having already received compound for the second record. At the same time the record clamp opens and the pressure disk descends thereby depositing the first record on the turntable and holding it in position on that turntable.

The record compound arm 302 now moves downwardly to position immediately above the lower mold half and at the same time the flash trimmer and breaker unit of FIGURES 24 through 27 moves inwardly into position to trim the flash from the first record which action starts as the mechanism moves into position since the turntable is rotating under drive of its friction clutch and the cutter knives and breaker rolls are continuously driven by the drive motor 715.

The record material arm clamp now opens depositing material for the second record upon the lower mold half or more accurately upon the label already deposited upon that mold half after which the arm 302 immediately moves upwardly and thereafter returns to its outer position for reception of material for the third record. While the record material transport arm 292 is moving into the outward position the material clamping means comprising the members 327 and 314 close to provide for receipt of material for the third record.

Immediately thereafter the mold halves move into the press and upon arrival at the rearward (right hand FIG. 14) position cause energization of the molding cycle timer which, as described hereinabove, operates through its cycle causing the mold halves to be heated, die pins to engage, the ram to be operated, the mold halves to be cooled and the mold halves then removed to their position outside the press. Also, the mold cycle timer causes ejection of a measured quantity of the record compound into the record material transport arm cup or clamp which, as stated, is in position to receive material for the third record.

During the molding cycle the label arms 201 and 202 pick up a pair of labels which will be utilized for the third record.

Now the record remover arm 500 again moves inwardly in order to be positioned above the second record and at the same time the record trimming mechanism moves outwardly having completed the trimming of the first record. Immediately thereafter the record discharge fork moves upwardly picking up the first record and causing it to slide down the discharge tracks into the completed record container 891.

The clamp ring of the record remover arm now descends to position to pick up the second record and immediately thereafter the clamping fingers close on the flash of that record. Thereafter the record remover arm moves upwardly with the second record held thereon and the arm moves outwardly while at the same time the record discharge fork 816 moves downwardly to position to receive the second record.

Next the label arms move in with the pair of labels for the third record and these labels are deposited on the corresponding mold parts after which the label arms return to pick up a pair of labels for the succeeding record. Again the compound arm moves into position above the lower mold half with compound for a third record and deposits that compound on the mold half. At the same time the pressure plate 530 moves downwardly to hold the second record on the turntable 600.

Immediately thereafter the compound arm moves downwardly to deposit the material for the third record and the trimming mechanism moves inwardly and commences trimming the second record.

As before, the operations proceed with respect to the third record and simultaneously the second record trimming is completed, the record discharge fork 816 operated and the second record discharged into the container.

The cycling of the machine now continues in the manner described and records are produced so long as record material is supplied to the hopper and the label magazines are kept stocked.

Although the start up of the machine has been described under particular conditions, it will be obvious that there will be many ways in which the machine may be placed in operation and that the cycling of the press may also be initiated either by operation of the Seeley timer or by manually closing circuits controlled by that timer to perform specific operations such as admission of heating fluid to the mold passages.

From the above description it will also be recognized that although a single size of record has been considered, other sizes may be produced by effecting rather minor changes in the mechanisms. For example, if different size records are to be produced this does not in any way change the arcs of movement of the material transporting arm or the label arms or record remover arm. It is therefore necessary only to change the mold halves and stampers, regulate the amount of material discharged into the material transport arm, change the record remover clamping head and pressure plate, and replace the turntable, record discharge fork and discharge container with ones of different size.

While a particular means of generating timing pulses to supply a stepping switch has been described, it will also be understood that many other modes of operation of a stepping switch of the type described or of another type might be utilized to produce proper sequential operation of the various mechanisms.

Therefore, although a particular embodiment of the machine has been described in detail, it will be understood that since the foregoing modifications and others may readily be made by those skilled in the art, I wish to be limited not by the foregoing description but on the contrary only by the claims granted to me.

What is claimed is:

1. In an automatic machine for making disk phonograph records, in combination, a press; separable mold members adapted to enter said press; means for supplying a label to each said mold member, said label supply means comprising a magazine having a spindle adapted to receive the central apertures of record labels, an annular ring having radially inwardly extending fingers, said ring lying in a plane substantially perpendicular to the axis of said spindle, said fingers extending over the outer margin of the outermost label on said spindle, pressure means for compressing said labels against said fingers and means for releasing said pressure at timed intervals and suction means for removing a label from said spindle and transferring it to said mold; means for supplying record material to one of said mold members, means for causing mold members to enter said press with said labels and material in position between said mold members, means for causing said press to operate through a cycle of operation to press a record and means to move said mold members out of said press upon completion of a pressing operation.

2. An automatic machine for making disk phonograph records as claimed in claim 1, wherein said pressure means comprises a block guided for movement parallel to said spindle axis, a sleeve slidably mounted on said spindle axis and fixed to said block, and means for reciprocating said block and sleeve relative to said spindle and ring.

3. In an automatic machine for making disk phonograph records, in combination, a press; separable mold members adapted to enter said press; means for supplying a label to each said mold member; means for supplying record material to one of said mold members, said material supply means comprising a record material transport arm, means mounting said arm upon a pivot fixed relative to said press, means for operating said arm about said pivot to position the end thereof in position to receive record material and in position to deposit material on one of said mold members, said record material receiving means including a split ring having separable halves, said split ring cooperating with arcuate members forming a partial bottom, said ring halves being resiliently urged together, and means mounted on said arm for opening said split ring and said partial bottom successively to deposit record material on said one mold; means for causing said mold members to enter said press with said labels and material in position between said mold members, means for causing said press to operate through a cycle of operation to press a record, and means to move said mold members out of said press upon completion of a pressing operation.

4. An automatic machine for making disk phonograph records as claimed in claim 3, wherein said halves of said split ring and said partial bottom members are pivotally mounted on said arm and wherein reciprocatory means are mounted on said arm and connected to said partial bottom members to pivot said members about said mounting, said split ring halves being operated by said bottom members through lost motion connections.

5. An automatic machine for making disk phonograph records as claimed in claim 3, wherein means are provided for reciprocating said arm in a direction parallel to its pivotal axis to thereby lower the material transporting cup comprising said split ring halves and partial bottom members upon the mold member.

6. In an automatic machine for making disk phonograph records, in combination, a press, separable mold members adapted to enter said press, means for supplying a label to each said mold member, means for supplying record material to one of said mold members, means for causing said mold members to enter said press with said labels and material in position between said mold members, means for causing said press to operate through a cycle of operation to press a record, means to move said mold members out of said press upon completion of a pressing operation, means to separate said mold members, means to retain a pressed record on a predetermined one of said mold members during said separation comprising a plurality of pins fixed in said mold member outside the finished record area, said pins being spaced about the circumference of a circle the diameter of which is greater than the diameter of a finished record, said pins thus lying in the path of flash which flows around said pins as said record is pressed, whereby said record is retained upon said mold member when the mold members separate, and means to remove the pressed record from said one mold member.

7. An automatic machine for making disk phonograph records as claimed in claim 6, wherein said pins have enlarged heads tapering downwardly to thereby assure that the flash remains on said one mold member.

8. An automatic machine for making disk phonograph records as claimed in claim 14 wherein said record removing means comprises an arm oscillatably mounted on a shaft fixed in position relative to said press, means for oscillating said arm from a position in alignment with said one mold member to a position of discharge, a disk mounted at the outer end of said arm for reciprocatory movement in a plane substantially parallel to the axis of oscillation of said arm, a pair of rings mounted on said disk, one of said rings being stationary and the other oscillatable, said pairs of fingers being fixed to said rings, one of each pair being fixed to the stationary ring and one to the oscillatable ring, and said means for moving said fingers toward each other comprising means for oscillating said oscillatable ring relative to said fixed ring.

9. An automatic machine for making disk phonograph records as claimed in claim 3, wherein said record removing means comprises an arm pivotally mounted on a pivot fixed relatively to said press, means for oscillating said arm from a position in alignment with said one mold member to a position of discharge, a disk mounted at the outer end of said arm for reciprocatory movement in a plane substantially parallel to the pivotal axis of said arm, means for reciprocating said disk to remove a record from said one press member and deposit it on said turntable, a second disk mounted for reciprocatory movement relative to said first disk and said arm and means to reciprocate said second disk to hold a record on said turntable after deposit of the record thereon by reciprocatory movement of said first disk.

10. In an automatic machine for making disk phonograph records, in combination, a press, separable mold members adapted to enter said press, means for supplying a label to each said mold member, means for supplying record material to one of said mold members, means for causing said mold members to enter said press with said labels and material in position between said mold members, means for causing said press to operate through a cycle of operation to press a record, means to move said mold members out of said press upon completion of a pressing operation, means to separate said mold members, means to retain a pressed record on a predetermined one of said mold members during said separation, means for trimming flash from the record, said means comprising a turntable and trimming knives, means for operating said record removing means to position a record on said turntable adjacent said trimming knives, means to engage said trimming knives with said record to trim the flash therefrom, and means comprising a pair of rollers mounted adjacent said trimming knives for breaking the trimmed flash, one of said rollers having sharpened ribs thereon, said ribs engaging the surface of the other of said rollers and cutting the flash into small pieces.

11. An automatic machine for making disk phonograph records as claimed in claim 10, wherein said flash breaking rollers are mounted on parallel shafts, one of said rollers comprising a sleeve mounted on the respective shaft, said sleeve having a greater diameter than said shaft and being spaced therefrom by a plurality of resilient rings whereby the periphery of said roller is pressed against the ribs of the mating roller.

12. In an automatic machine for making disk phonograph records, in combination, a record press, separable mold members adapted to enter said press, means comprising a pair of arms oscillatable from positions away from said press to positions adjacent said separable mold members for supplying a label to each of said mold members, a pair of switches one of which is operable as said label arms approach each of said limiting positions, means comprising an oscillatable arm for supplying record material to one of said mold members, a pair of switches one operable as said arm approaches each of its limiting positions, means for causing said mold members to enter said press with said labels and record material in position between said mold members, means for causing said press to operate through a cycle of operation to press a record, means to move said mold members out of said press upon completion of a pressing operation, switch means operated by movement of said mold members out of said press, means to separate said mold member, means to retain a pressed record on a predetermined one of said mold members during said separation, means comprising a pivotally mounted arm oscillatable from position in alignment with said one of said mold members to a position outside of said press, a pair of switches one of which is operated as said record removing arm approaches each of its limiting positions, a stepping switch, pulsing means for causing the wipers of said stepping switch to advance in timed sequence and means operable by said switches to delay the next stepping action of said wipers until said switch operating elements have completed their movements to the corresponding limiting position.

13. In an automatic machine for making disk phonograph records, in combination, a press, separable mold members adapted to enter said press, means for supplying a label to each said mold member, means for supplying record material to one of said mold members, means for causing said mold members to enter said press with said labels and material in position between said mold members, means for causing said press to operate through a cycle of operation to press a record, means to move said mold members out of said press upon completion of a pressing operation, means to separate said mold members, means to retain a pressed record on a predetermined one of said mold members during said separation comprising a plurality of pairs of fingers, said fingers lying on the same side of the record and being spaced about a circumference greater than the circumference of the finished record whereby said fingers may engage the flash connected to a pressed record, and means for moving said fingers of each pair toward and away from each other to engage and release portions of the flash of a pressed record and means to remove the pressed record from said one mold member.

14. In an automatic machine for making disk phonograph records, in combination, a press, separable mold members adapted to enter said press, means for supplying a label to each said mold member, means for supplying record material to one of said mold members, means for causing said mold members to enter said press with said labels and material in position between said mold members, means for causing said press to operate through a cycle of operation to press a record, means to move said mold members out of said press upon completion of a pressing operation, means to separate said mold members, means to retain a pressed record on a predetermined one of said mold members during said separation comprising a plurality of pins fixed in said one mold member and spaced apart on the circumference of a circle greater than the circumference of a finished record, said pins lying in the path of flash formed on the record as it is pressed thereby forming radially extending indentations in the flash and thickened flash portions radially inward of said pins, and means to remove the pressed record from said one mold member comprising pairs of fingers spaced about a circumference radially inward of said pins and means to move said fingers toward each other to engage at least some of said thickened flash portions.

15. In an automatic machine for making disk phonograph records, in combination, a press, separable mold members adapted to enter said press, means for supplying a label to each said mold member, means for supplying record material to one of said mold members, means for causing said mold members to enter said press with said labels and material in position between said mold members, means for causing said press to operate through a cycle of operation to press a record, means to move said mold members out of said press upon completion of a pressing operation, means to separate said mold members, means to retain a pressed record on a predetermined one of said mold members during said separation, means comprising a turntable for rotating said record, rotary interengaging knives for trimming flash from the record, said knives being continuously driven, said drive means being mounted on a plate, which plate is rotatably mounted in fixed position relative to said turntable, means to position a record on said turntable adjacent said trimming knives, means to engage said trimming knives with said record to trim the flash therefrom and flash breaking means also mounted on said plate adjacent said knives and driven by said drive means, means to oscillate said plate to engage said knives and flash breaking rollers with the flash, said knives engaging said flash immediately radially outward of the finished record and said rollers having ribs extending across the flash to thereby break the flash into small pieces as it is trimmed from the record by said knives.

16. In an automatic machine for making disk phonograph records, in combination, a press, separable mold members adapted to enter said press, means for supplying a label to each said mold member, means for supplying record material to one of said mold members, means for causing said mold members to enter said press with said labels and material in position between said mold members, means for causing said press to operate through a cycle of operation to press a record, means to move said mold members out of said press upon completion of a pressing operation, means to separate said mold members, means to retain a pressed record on a predetermined one of said mold members during said separation, means for trimming flash from the record, said means comprising a turntable and trimming knives, means for operating said record removing means to position a record on said turntable adjacent said trimming knives, means to engage said trimming knives with said record to trim the flash therefrom, and means for removing a trimmed record from said turntable, said means comprising a fork member pivotally mounted adjacent said turntable, said fork having prongs spaced apart a greater distance than the diameter of said turntable and a lesser distance than the diameter of a finished record, said fork normally extending horizontally and underlying the record as the flash is trimmed therefrom, means for oscillating said fork about its pivotal axis to thereby lift the record from said turntable, a track formed in said fork to guide a record for sliding movement after tipping of said fork, a record container having an inclined track at the upper edge thereof, said track mating with said fork track, said container track having sections omitted therefrom at the end remote from said fork and means at the end of said container for stopping a record as it slides along said tracks whereby the record leaves said track and is deposited in said container.

References Cited by the Examiner

UNITED STATES PATENTS

| 1,930,931 | 10/33 | Fernberg | 18—5.3 XR |
| 2,154,028 | 4/39 | Brasman et al. | 82—53 |
| 2,584,479 | 2/52 | MacDonald | 82—57 |
| 2,743,478 | 5/56 | Harlow et al. | 18—5.3 |
| 2,995,775 | 8/61 | Schnitzius et al. | |

FOREIGN PATENTS

| 89,502 | 8/60 | Denmark. |
| 1,193,361 | 4/59 | France. |

WILLIAM J. STEPHENSON, *Primary Examiner.*

MICHAEL V. BRINDISI, *Examiner.*

UNITED STATES PATENT OFFICE
CERTIFICATE OF CORRECTION

Patent No. 3,186,029                June 1, 1965

William Joseph

It is hereby certified that error appears in the above numbered patent requiring correction and that the said Letters Patent should read as corrected below.

Column 7, line 15, for "no" read -- not --; column 14, line 60, for "proper" read -- properly --; column 22, line 62, for "relay" read -- delay --; column 30, line 55, for the clai reference numeral "3" read -- 13 --.

Signed and sealed this 30th day of November 1965.

(SEAL)
Attest:

ERNEST W. SWIDER
Attesting Officer

EDWARD J. BRENNER
Commissioner of Patents